(12) United States Patent
Mclellan

(10) Patent No.: US 12,086,004 B2
(45) Date of Patent: Sep. 10, 2024

(54) SELECTABLE AND HIERARCHICAL POWER MANAGEMENT

(71) Applicant: SiFive, Inc., San Mateo, CA (US)

(72) Inventor: Edward Mclellan, Holliston, MA (US)

(73) Assignee: SiFive, Inc., Santa Clara, CA (US)

( * ) Notice: Subject to any disclaimer, the term of this patent is extended or adjusted under 35 U.S.C. 154(b) by 35 days.

(21) Appl. No.: 17/851,881

(22) Filed: Jun. 28, 2022

(65) Prior Publication Data

US 2023/0015240 A1 Jan. 19, 2023

Related U.S. Application Data

(60) Provisional application No. 63/221,190, filed on Jul. 13, 2021.

(51) Int. Cl.
*G06F 1/26* (2006.01)
*G06F 1/28* (2006.01)

(52) U.S. Cl.
CPC .............. *G06F 1/266* (2013.01); *G06F 1/28* (2013.01)

(58) Field of Classification Search
None
See application file for complete search history.

(56) References Cited

U.S. PATENT DOCUMENTS

| | | | |
|---|---|---|---|
| 5,812,860 A | 9/1998 | Horden et al. | |
| 2002/0147392 A1 | 10/2002 | Steines et al. | |
| 2003/0110012 A1 | 6/2003 | Orenstien et al. | |
| 2012/0151227 A1 | 6/2012 | Gaskins | |
| 2014/0143565 A1 | 5/2014 | Paul et al. | |
| 2014/0181554 A1 | 6/2014 | Manne et al. | |
| 2018/0314308 A1 | 11/2018 | Savidis et al. | |
| 2021/0018971 A1 | 1/2021 | Rotem et al. | |
| 2021/0182066 A1 | 6/2021 | Shenoy et al. | |

OTHER PUBLICATIONS

International Search Report for Application No. PCT/US2022/035407, mailed Dec. 19, 2022, 8 pages.
Written Opinion for Application No. PCT/US2022/035407, mailed Dec. 19, 2022, 18 pages.
International Preliminary Report on Patentability for Application No. PCT/US2022/035407, date of issuance Jan. 16, 2024, 19 pages.

*Primary Examiner* — Paul Yen
(74) *Attorney, Agent, or Firm* — Kilpatrick Townsend & Stockton LLP

(57) ABSTRACT

Described are systems and methods for power management. A processing system includes one or more cores and a connected power management unit (PMU). The PMU is selected from one of: a first level PMU which can power scale a; a second level PMU which can independently control power from a shared cluster power supply to each core of two or more cores in a cluster; a third level PMU where each core includes a power monitor which can track power performance metrics of an associated core; and a fourth level PMU when a complex includes multiple clusters and each cluster includes a set of the one or more cores, the fourth level PMU including a complex PMU and a cluster PMU for each of the multiple clusters, the complex PMU and cluster PMUs provide two-tier power management. Higher level PMUs include power management functionality of lower level PMUs.

21 Claims, 14 Drawing Sheets

SELECTABLE AND HIERARCHICAL POWER MANAGEMENT

CROSS-REFERENCE TO RELATED APPLICATION

This application claims priority to U.S. Provisional Application No. 63/221,190, filed on Jul. 13, 2021, the contents of which are incorporated by reference herein.

TECHNICAL FIELD

This disclosure relates to power management and in particular, selectable power management architecture.

BACKGROUND

Power is tied to overall system-on-chip (SoC) performance including, but not limited to, battery life, energy consumption, thermal profile, cooling requirements, noise profile, system stability, sustainability, and operational costs. Power management techniques can be used to control power consumption by controlling the clock rate and by using voltage scaling, power gating, and other techniques.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
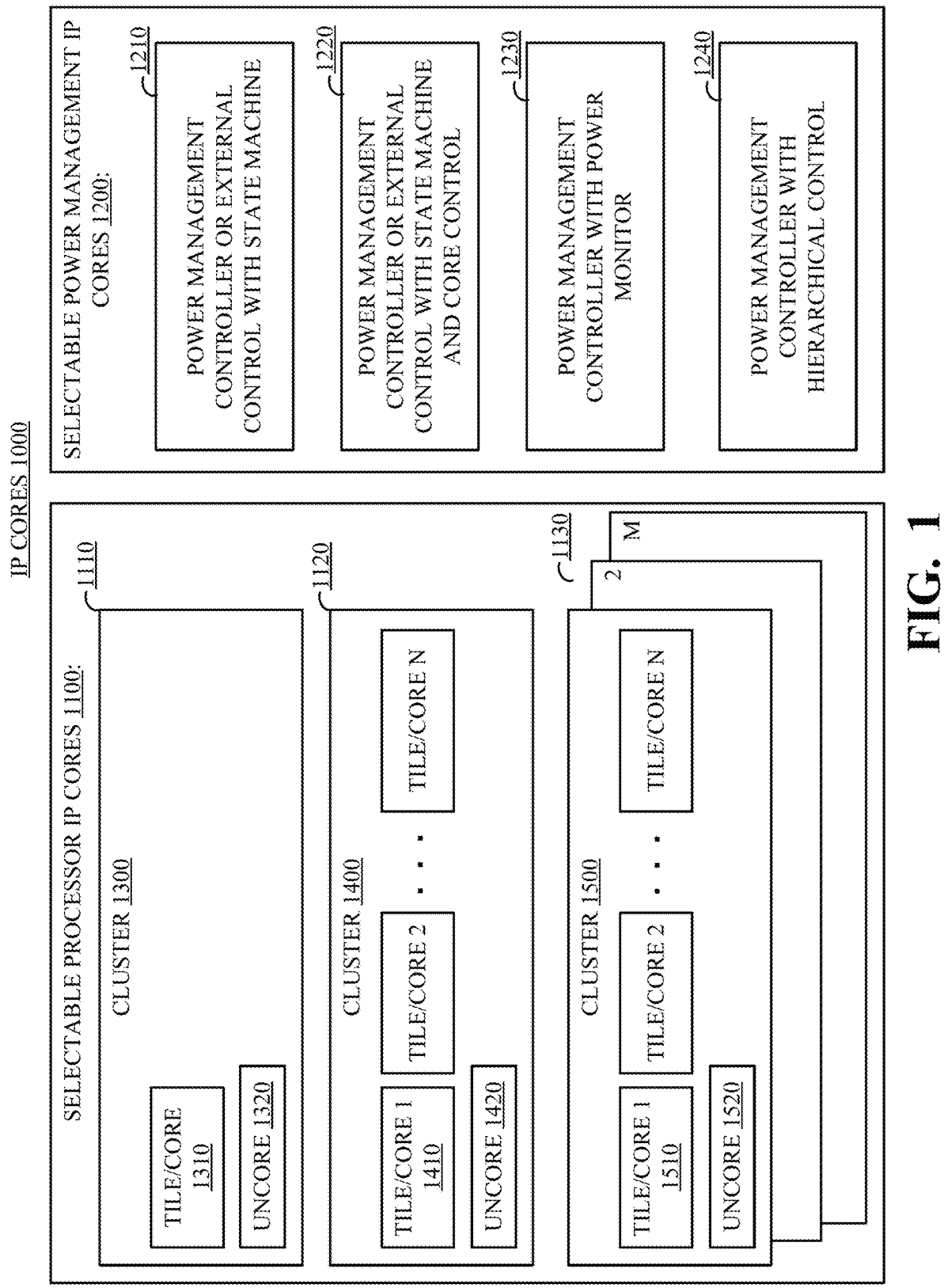
FIG. 1 is a block diagram of an example of a selectable power management system in accordance with embodiments of this disclosure.

Disclosed herein are systems and methods for selectable and hierarchical power management. Processor intellectual property (IP) cores are available in a range of configurations or architectures where the number of cores, clusters, or both can vary. A one size fits all power management system is not practical or efficient in terms of chip space, costs, and other factors. Multiple power management IP cores are provided which are selectable based on a selected processor IP core. Upon selection of the processor IP core and a power management IP core, a system for automated integrated circuit design, such as described in U.S. Patent Application Publication No. 20200042664, filed Aug. 1, 2019, the contents of which are herein incorporated by reference in its entirety, and which is assigned to the Applicant (the "'664 Publication"), can be used to generate the integrated circuit, processing system, or SoC.

An aspect is a processing system which includes one or more cores and a power management unit connected to the one or cores. The power management unit is selected from one of: a first level power management unit when the one or more cores is a core, the first level power management unit configured to power scale the core; a second level power management unit when the one or more cores is two or more cores in a cluster, the second level power management unit configured to independently control power from a shared cluster power supply to each core of the two or more cores; a third level power management unit when each core of the two or more cores includes a power monitor, each power monitor configured to track power performance metrics of an associated core; and a fourth level power management unit when a complex includes multiple clusters and each cluster includes a set of the one or more cores, the fourth level power management unit including a complex power management unit and a cluster power management unit for each of the multiple clusters, the complex power management unit and cluster power management units providing two-tier power management for power allocation and core performance, where each higher level power management unit includes power management functionality of lower level power management units.

These and other aspects of the present disclosure are disclosed in the following detailed description, the appended claims, and the accompanying figures.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function. For example, the processor can be a circuit.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

FIG. 1 is a block diagram of an example of selectable IP cores 1000 including selectable processor IP cores 1100 and selectable power management IP cores 1200 in accordance with embodiments of this disclosure. The selectable processor IP cores 1100 can include, but is not limited to, processor IP cores 1110, 1120, and 1130. These processor IP cores 1110, 1120, and 1130 can be matched up with one of the selectable power management IP cores 1200, including, but not limited to, power management IP core 1210, 1220, 1230, and 1240.

For example, the processor IP core 1110 can include, but is not limited to, a cluster 1300 which includes, but is not limited to, a tile or core 1310 connected to an uncore 1320. The processor IP core 1120 can include, but is not limited to, a cluster 1400 which includes, but is not limited to, tiles or cores 1, 2, . . . , N 1410 connected to an uncore 1420. The processor IP core 1130 can include, but is not limited to, clusters 1, 2, . . . , M 1500 each of which includes, but is not limited to, tiles or cores 1, 2, . . . , N 1510 connected to an uncore 1520.

For example, the power management IP core 1210 can be a power management controller or external controller with a finite state machine as described herein. The power management IP core 1220 can be a power management controller or external controller with a finite state machine and core control as described herein. The power management IP core 1230 can be a power management controller with power monitoring as described herein. The power management IP core 1240 can be a power management controller with hierarchical control as described herein. Each power management IP core 1220, 1230, and 1240 can include the features and/or functionality of earlier power management IP cores 1210, 1220, and 1230.

Operationally, as described in the '664 Publication, the contents of which are incorporated herein by reference in its entirety, a web interface and/or a scripting application programming interface (API) can be provided for selecting a set of design parameter values associated with one or more template integrated circuit designs or IP cores such as the selectable IP cores 1000, the selectable processor IP cores 1100 and the selectable power management IP cores 1200. The selected power management IP core can match a desired level of power management control with respect to the selected processor IP core.

The template designs may be encoded using conventions to facilitate modular design. A set of design parameter values is encoded in a design parameters data structure and passed to an automated system for generation and testing of an integrated circuit design using the chosen design parameter values. For example, the design parameters of the design parameters data structure may include whether privilege modes are supported, whether multiply extension is supported, whether floating point extension is supported, whether error-correcting codes are supported in on-chip memory, the size of an instruction cache, an associativity of the instruction cache, a size of a data subsystem in on-chip memory, whether a port (e.g., a front port, a system port, a peripheral port, or a memory port) is included, a count of memory port channels, a port communication protocol selection, a bus width, a count of physical memory protection units, whether JTAG debugging is supported, a count of hardware breakpoints, whether instruction tracing is supported, whether debug direct memory access is supported, a count of local interrupts, whether a platform level interrupt controller is supported, a count of interrupt priority levels, a count of global interrupts, whether branch prediction is supported, a count of branch target buffer entries, a count of branch history table entries, and/or a selection of a manufacturing process. The system for automated integrated circuit design can the generate an integrated circuit or SoC based on the selected processor IP core 1100 and the selectable power management IP core 1200.

Figure 2:
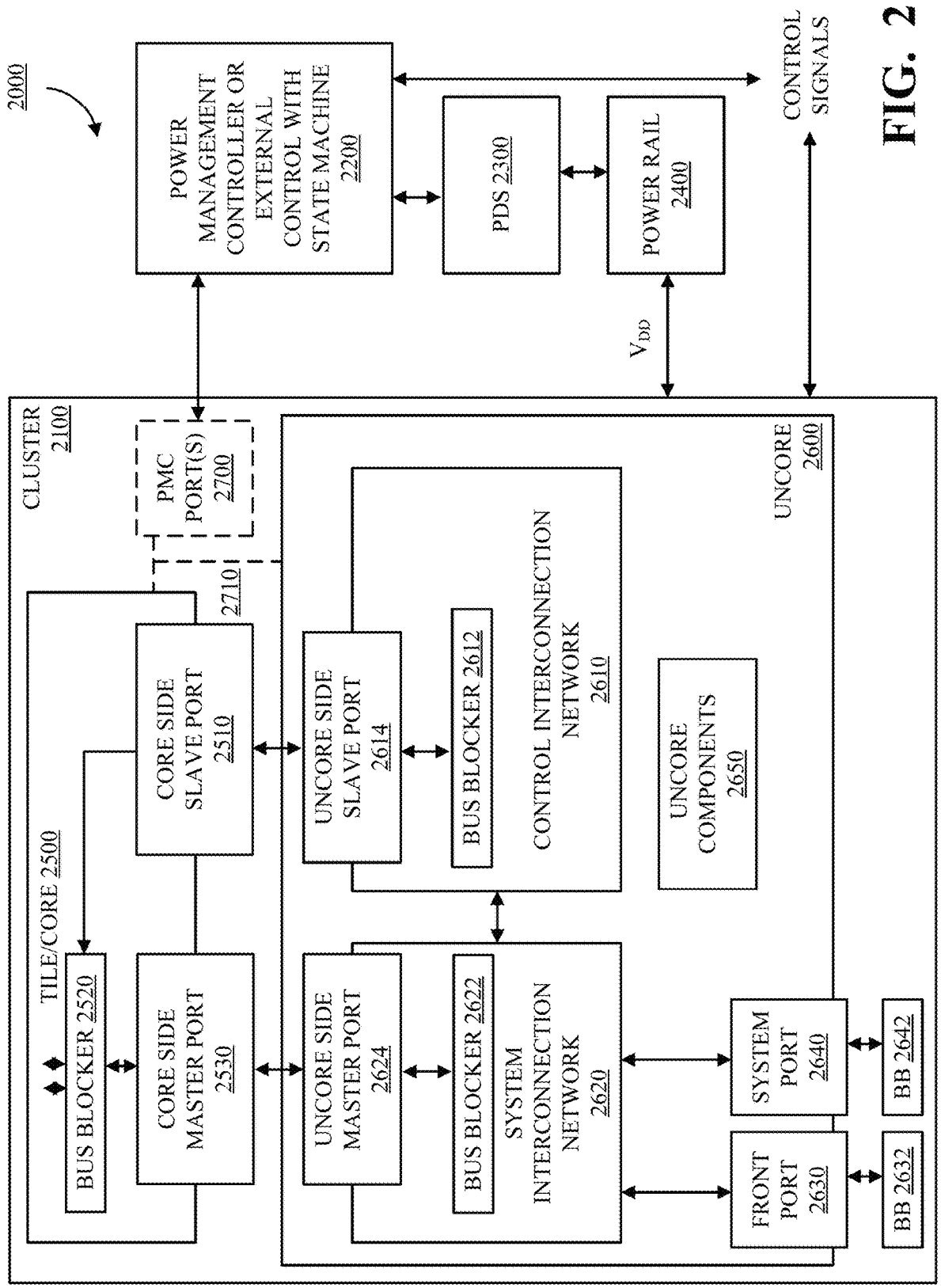
FIG. 2 is a block diagram of an example of a processing system with a first level power management system in accordance with embodiments of this disclosure.

FIG. 2 is a block diagram of an example of a processing system 2000 with a first level power management system in accordance with embodiments of this disclosure. The processing system 2000 can implement a pipelined architecture. The processing system 2000 can be configured to decode and execute instructions of an instruction set architecture (ISA) (e.g., a RISC-V instruction set). The instructions can execute speculatively and out-of-order in the processing system 2000. The processing system 2000 can be a compute device, a microprocessor, a microcontroller, or an IP core. The processing system 2000 can be implemented as an integrated circuit. The processing system 2000 and each element or component in the processing system 2000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The processing system 2000 includes a cluster 2100 which can be connected to or in communication with (collectively "connected to") a first level power management unit 2200 and a power domain sequencer 2300. The first level power management unit 2200 can be a power microcontroller (PMC) and/or external hardware or logic with a state machine as described herein. The power domain sequencer 2300 can be a microcontroller, a controller, and an external hardware or logic with a state machine. The cluster 2100 can be provided power via a power rail 2400, which is also connected to the PDS 2300.

The cluster can include a core 2500 which can be connected to an uncore 2600. The core 2500 can include a core side slave port or interface (collectively "port") 2510 connected to a bus blocker 2520, which in turn is connected to a core side master port 2530.

The uncore 2600 can include a control interconnection network 2610, a system interconnection network 2620, a front port 2630, a system port 2640, and uncore components 2650 which can include, but is not limited to, a last level cache, clock circuits, interrupt controllers and circuits, debug circuits, a debug manager, wrappers, command line interrupt circuits and controllers, cache coherence manager, and caches.

The control interconnection network 2610 and the system interconnection network 2620 are interconnected. The front port 2630 and the system port 2640 are connected to the system interconnection network 2620. At least some of the uncore components 4550 are connected to corresponding ports (not shown) and some are connected to the core 2500, the control interconnection network 2610, and the system interconnection network 2620 as appropriate and applicable.

The control interconnection network 2610 can include a bus blocker 2612 connected to a uncore side slave port 2614. The system interconnection network 2620 can include a bus blocker 2622 connected to a uncore side master port 2624. The bus blockers 4420, 4522, and 4512 can be implemented as described herein. The uncore side slave port 2614 is connected to the core side slave port 2510. The uncore side master port 2624 is connected to the core side master port 2530.

The control interconnection network 2610 and the system interconnection network 2620 can be a chip-scale interconnect such as TileLink. TileLink is a chip-scale interconnect standard providing multiple masters with coherent memory mapped access to memory and other slave devices. TileLink can connect cores, clusters, general-purpose multiprocessors, co-processors, accelerators, DMA engines, and simple or complex devices (collectively "entities"), using a fast scalable interconnect providing both low-latency and high throughput transfers. TileLink is defined in terms of a graph of connected agents that send and receive messages over point-to-point channels within a link to perform operations on a shared address space, where an agent is an active participant that sends and receives messages in order to complete operations, a channel is a one-way communication connection between a master interface (port) and a slave interface carrying messages of homogeneous priority, and a link is a set of channels required to complete operations between two agents. In a pair of connected entities, one entity can include an agent with a master interface and the other entity can include an agent with a slave interface. The agent with the master interface can request the agent with the slave interface to perform memory operations, or request permission to transfer and cache copies of data. The agent with the slave interface manages permissions and access to a range of addresses, wherein it performs memory operations on behalf of requests arriving from the master interface. A request must always receive a response. Consequently, one entity cannot be powered down while the other entity is powered on.

The cluster 2100 further includes a bus blocker 2632 connected to the front port 2630 and a bus blocker 2642 connected to the system port 2640.

A bus blocker, such as the bus blockers 2520, 2622, 2612, 2632, and 2642, can include registers, circuitry, and logic to maintain information and determine whether an entity associated with or corresponding to the bus blocker can be power gated. The bus blocker can report, via a signal or register polling, a status of the associated entity with respect to pending transactions or operations. Bus blockers are described in U.S. Patent Application No. 63/221,208, filed Jul. 13, 2021, and entitled "SYSTEMS AND METHODS FOR POWER GATING CHIP COMPONENTS", the contents of which are herein incorporated by reference in its entirety. For example, the bus blocker registers can enable or disable the passage of transactions sent on the interconnection network as between two entities, can identify or indicate if transactions are pending, in-flight, and/or complete as between two entities, can identify a CEASE state status for a core, and can determine which action to take with respect to uncore components when a last core in a cluster is power gated, when applicable. The actions can be, but are not limited to, leave the uncore components powered up and functional, flush a cache such as a last level cache, and power down the uncore components (effectively powering down the cluster), and/or functionally isolating the cluster and the last level cache in a state retention mode, but allowing transient power-up periods for cache operations. The bus blocker registers can be set by the power management controller 2200.

The first level power management unit 2200 can be connected to the cluster 2100, the core 2500, and the uncore 2600 via the control interconnection network 2610, the system interconnection network 2620, the front port 2630, and the system port 2640. In implementations, the first level power management unit 2200 can be connected to the cluster 2100, the core 2500, and the uncore 2600 via PMC ports 2700 and an interconnection network 2710.

The first level power management unit 2200 can provide control outside of the power domain (e.g., the core and/or cluster) being powered down to determine when all bus activity has completed and the domain is functionally isolated. The first level power management unit 2200 can communicate with the managed cores and/or clusters through the interconnection networks such as the control interconnection network 2610 and the system interconnection network 2620, via direct control signals, or combinations thereof. The first level power management unit 2200 can communicate with the power domain sequencer 2300 or similar logic to manage power delivery via the power rail 2400 to the managed domains.

A state machine of the first level power management unit 2200 can be implemented as hardware, software, and/or combinations thereof to sequence power states of a core. The state machine can cycle through multiple states to save or flush a core and/or cluster state, process power down trigger including checking transactional activity with respect to core and/or cluster, engage isolation devices, disconnect power rail to the core and/or cluster, and power up upon receipt of a reset or wake up interrupt.

For example, an initial state of the state machine is when a core is in a run state. The core can execute a CEASE instruction and send a notification to the first level power management unit 2200. The first level power management unit 2200 can initiate disabling of the clocks, debug controller or mechanisms, and other similar functions. The first level power management unit 2200 can then process through the bus blockers for transaction activity. If no activity is reported, the first level power management unit 2200 can notify the power domain sequencer 2300, for example, to initiate a power down sequence via the power rail 2400. The power domain sequencer 2300 can cyclically or loop-wise determine if the power down sequence is complete. If the power down sequence is complete, the core is then in an off state. If the core then receives a reset or wake signal (control signals), the power domain sequencer 2300 can initiate a power up sequence via the power rail 2400. The power domain sequencer 2300 can cyclically or loop-wise determine if the power up sequence is complete. If the power up sequence is complete, the first level power management unit 2200 can initiate enabling of the clocks, debug controller or mechanisms, and other similar functions. A reset signal can be de-asserted and the core can return to the run state. As noted, the power domain sequencer 2300 can gradually and/or sequentially enable and disable connections between the core 2500 and/or cluster 2100 power input and the power rail 2400. In implementations, external circuitry and/or systems, in cooperation with the first level power management unit 2200 and the power domain sequencer 2300, can provide control signals to enable and disable the clocks, provide reset signals, and other similar functionality.

Figure 3:
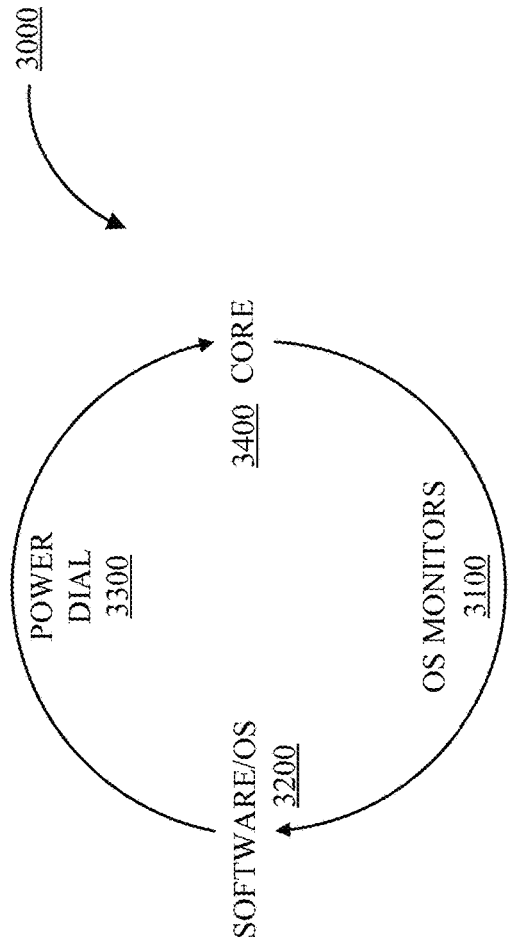
FIG. 3 is a block diagram of an example of a state machine for use in the implementation of FIG. 2 in accordance with embodiments of this disclosure.

FIG. 3 is a block diagram of an example of a state machine 3000 for use in the implementation of FIG. 2 in accordance with embodiments of this disclosure. The state machine 3000 can be implemented as hardware, software, and/or combinations thereof to power scale with respect to the core 2500. The state machine 3000 can provide software controlled, operating system (OS) controlled, or combinations thereof per core power scaling. For example, an OS can monitor the core 2500 with respect to power usage, frequency clock, temperature, latency, and other performance measures and metrics (collectively "performance metrics") (3100). Based on the monitored performance metrics, the software and/or OS can set a performance operating point (P-state) and write the P-state to a power dial control status register (CSR) with respect to the core 2500 (3200). The power dial CSR can enable or act upon the written P-state (3300) to apply same to the core 2500 (3400). The process is iterative.

Figure 4:
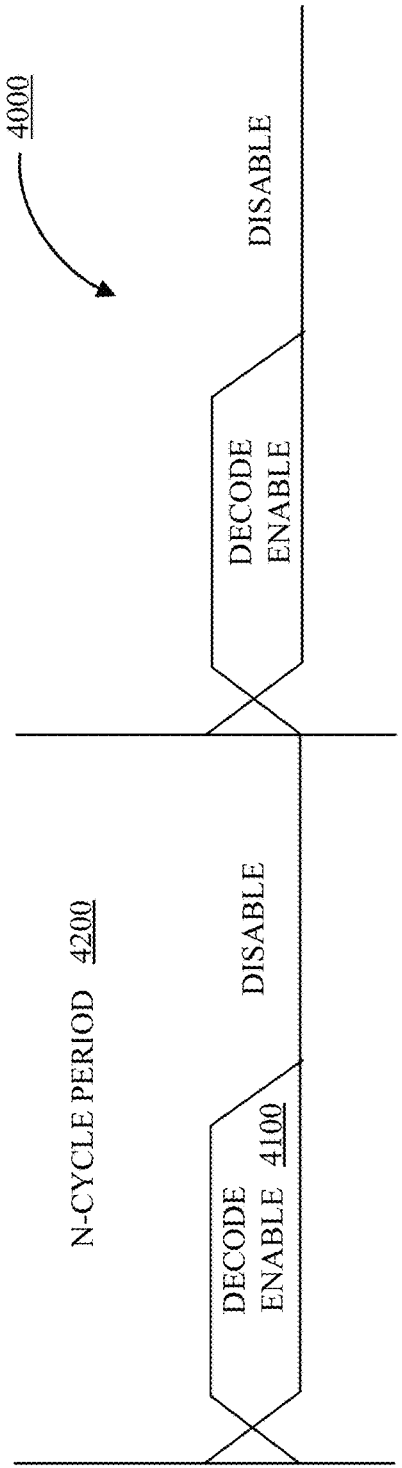
FIG. 4 is a block diagram of an example of a power dial for use in the implementation of FIG. 2 in accordance with embodiments of this disclosure.

FIG. 4 is a block diagram of an example of a power dial 4000 for use in the implementation of FIG. 2 and FIG. 3 in accordance with embodiments of this disclosure. The power dial 4000 can dynamically throttle instruction throughput at a decode stage. For example, the power dial can implement n configurations or enable values which can be selectable by the software or OS vis the power dial CSR. The power dial 4000 can be implemented as a or over a variable enable window 4100 over a defined cycle period 4200.

Figure 5:
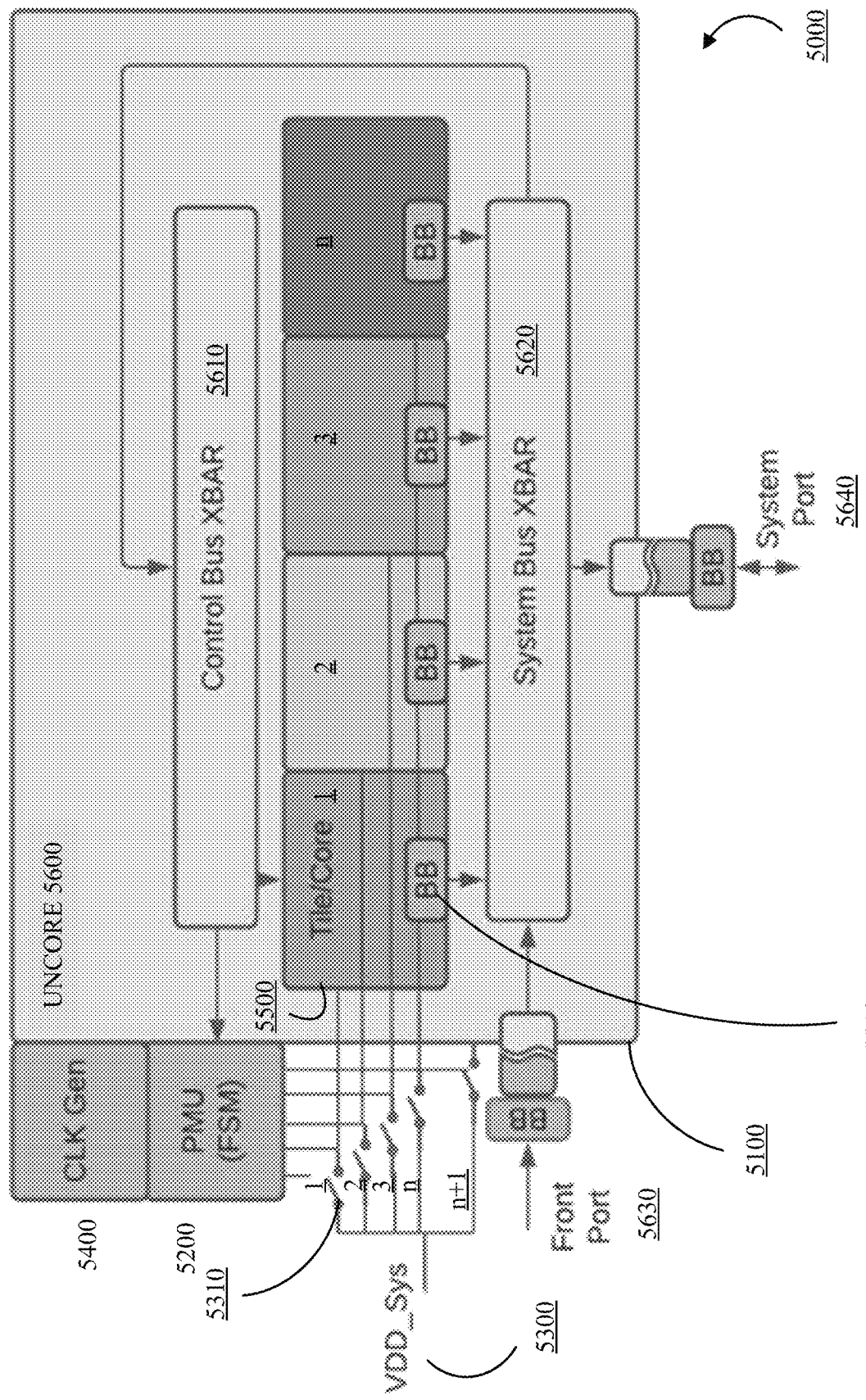
FIG. 5 is a block diagram of an example of a processing system with a second level power management system in accordance with embodiments of this disclosure.

FIG. 5 is a block diagram of an example of a processing system 5000 with a second level power management system in accordance with embodiments of this disclosure. The processing system 5000 can implement a pipelined architecture. The processing system 5000 can be configured to decode and execute instructions of an instruction set architecture (ISA) (e.g., a RISC-V instruction set). The instructions can execute speculatively and out-of-order in the processing system 5000. The processing system 5000 can be a compute device, a microprocessor, a microcontroller, or an IP core. The processing system 5000 can be implemented as an integrated circuit. The processing system 5000 and each element or component in the processing system 5000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The processing system 5000 includes a cluster 5100 which can be connected to a second level power management unit 5200, which can include a power domain sequencer (not shown). The second level power management unit 5200 can be a power microcontroller (PMC) and/or external hardware or logic with a state machine as described herein. The second level power management unit 5200 can include at least the features and functions described herein for the first level power management unit 2200. The cluster 5100 can be provided power via a power system 5300 as described herein, where the power system 5300 is a shared power plane. The cluster 5100 can be provided clock signals from a clock generator 5400.

The cluster 5100 can include one or more cores 1, 2, 3, . . . , n 5500 which can be connected to an uncore 5600. In implementations, n can be 4. Each core 5500 can include ports as described herein and a bus blocker 5510. The power system 5300 can provide controllable power rails 1, 2, 3, . . . , n+1 5310 to each of the cores 1, 2, 3, . . . , n 5500 and the uncore 5600. The second level power management unit 5200 can be connected to and individually and independently control each of the power rails 1, 2, 3, . . . , n+1 5310 from the power system 5300 as described herein.

The uncore 5600 can include a control interconnection network 5610, a system interconnection network 5620, a front port 5630, a system port 5640, and uncore components (not shown) which can include, but is not limited to, a last level cache, clock circuits, interrupt controllers and circuits, debug circuits, a debug manager, wrappers, command line interrupt circuits and controllers, cache coherence manager, and caches. The control interconnection network 5610 and the system interconnection network 5620 are interconnected. The control interconnection network 2610 and the system interconnection network 2620 can be a chip-scale interconnect such as TileLink as described herein. The front port 5630 and the system port 5640 are connected to the system interconnection network 5620.

The cluster 5100 further includes a bus blocker 5632 connected to the front port 5630 and a bus blocker 5642 connected to the system port 5640. The cluster 5100 can include other ports and bus blockers as shown, for example, in FIG. 2. The bus blockers 5510, 5632, and 5642 can be implemented as described herein.

The second level power management unit 5200 can be connected to the cluster 5100, the cores 5500, and the uncore 5600 via the control interconnection network 5610, the system interconnection network 5620, the front port 5630, and the system port 5640, as appropriate and applicable. In implementations, the second level power management unit 5200 can be connected to the cluster 5100, the cores 5500, and the uncore 5600 via power management ports and an interconnection network (not shown in FIG. 5 but illustrated in FIG. 2).

The second level power management unit 5200 can provide control outside of the power domain (e.g., the core and/or cluster) being powered down to determine when all bus activity has completed and the domain is functionally isolated. The second level power management unit 5200 can communicate with the managed cores and/or clusters through the interconnection networks such as the control interconnection network 5610 and the system interconnection network 5620, via direct control signals, or combinations thereof.

As noted, the second level power management unit 5200 can be connected to and individually and independently control each of the power rails 1, 2, 3, . . . , n+1 5310 to enable or disable one or more of the cores 5500, the uncore 5600, the cluster 5100, or combinations thereof in a sequential manner to avoid power disturbance on the power system 5300.

Figure 6:
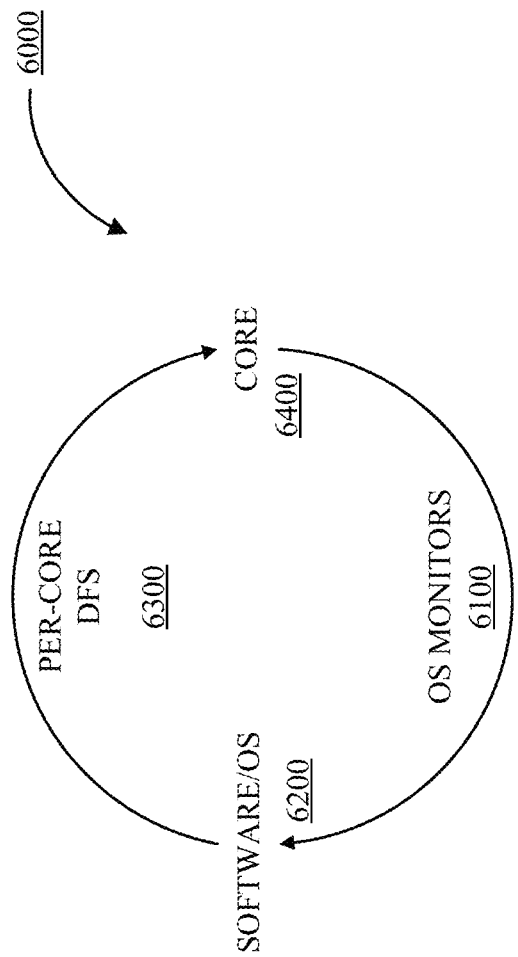
FIG. 6 is a block diagram of an example of a state machine for use in the implementation of FIG. 5 in accordance with embodiments of this disclosure.

The second level power management unit 5200 can implement the state machines as described herein with respect to FIG. 2, FIG. 3 and FIG. 4. The second level power management unit 5200 can implement a state machine 6000 as shown in FIG. 6. The state machine 6000 can be implemented as hardware, software, and/or combinations thereof to provide per core power scaling options.

The state machine 6000 can include cycling through multiple states to provide dynamic frequency scaling (DFS). In implementations, the DFS can be provided on a cluster level. In implementations, the DFS can be provided per core. Note that in implementations, in a group of cores plus uncore components, the cores typically run at different frequencies than the uncore. To minimize the latency involved in communication between these two clock domains, if the frequencies are maintained as fixed multiples of a common, higher frequency clock, then faster communication is possible. If the frequencies are unrelated, then the interface must be treated as asynchronous and requires longer latency communication to account for the time that it takes to synchronize from one clock domain to another. Consequently, dynamic frequency scaling can be provided on a per-core basis if core frequencies are restricted to values that support the fixed ratios relative to the uncore frequency to avoid asynchronous crossings (e.g., use of rational clock crossings). In an implementation, the highest priority core can select an optimal frequency, then determine an acceptable frequency for the uncore with the proper ratio and lastly, determine frequencies for the other, lower priority cores to be as near as possible to a desired frequency determined by their operational parameters (e.g., power use, performance, temperature, and/or voltage) in the system. In implementations, each core can have complete autonomy in selecting an optimal frequency. In this instance, then crossing between the core and uncore clock domains may require an asynchronous FIFO architecture. The state machine 6000 can provide software controlled, operating system (OS) controlled, or combinations thereof per core power scaling. For example, an OS can monitor one or more cores with respect to power usage, frequency clock, temperature, latency, and other performance measures and metrics (collectively "performance metrics") (6100). Based on the monitored performance metrics, the software and/or OS can determine (6200) and set a new frequency (6300) for application to a specific core (6400) to execute the next iteration of the control loop. The process is iterative.

Figure 7:
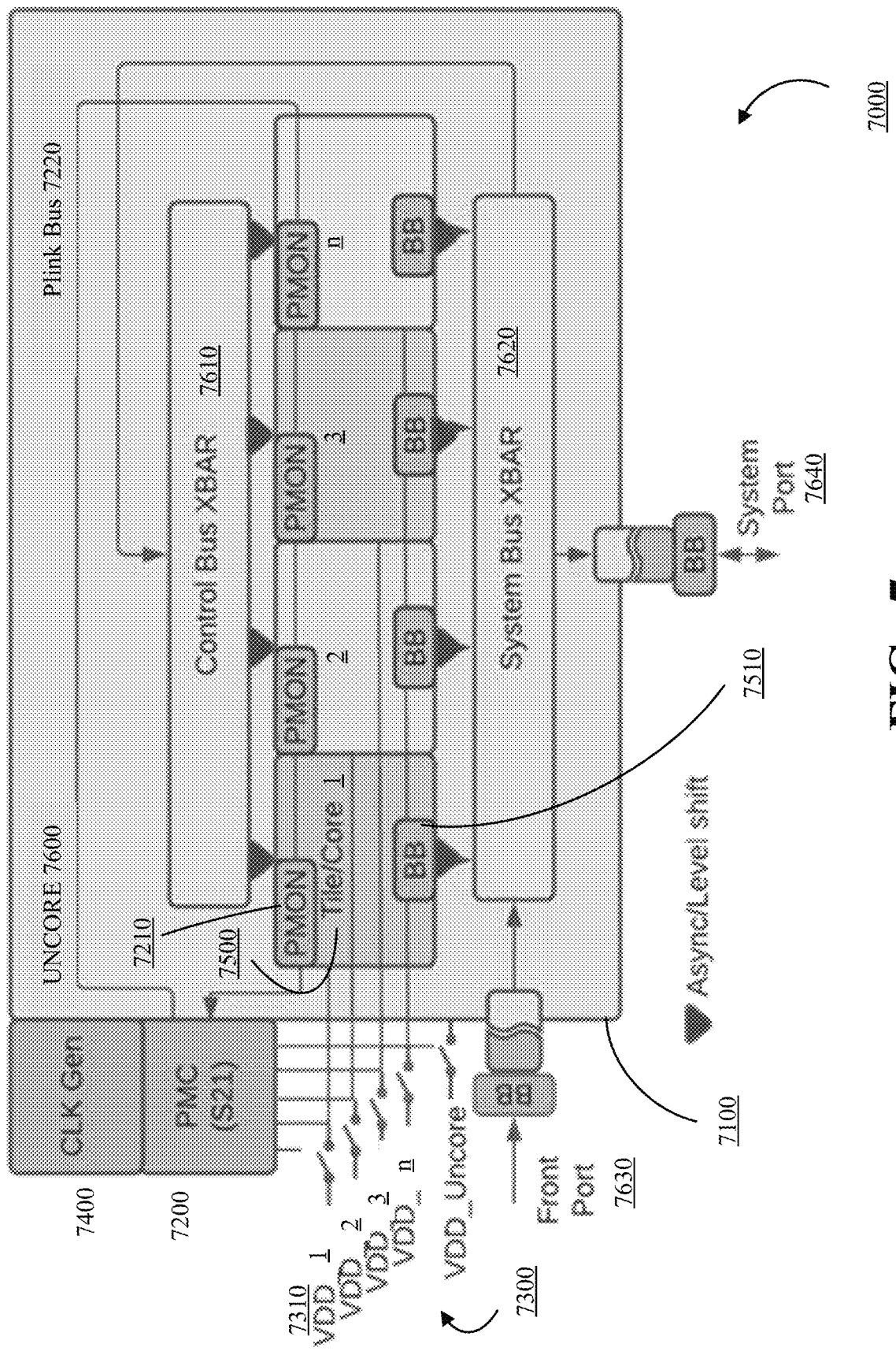
FIG. 7 is a block diagram of an example of a processing system with a third level power management system in accordance with embodiments of this disclosure.

FIG. 7 is a block diagram of an example of a processing system 7000 with a third level power management system in accordance with embodiments of this disclosure. The processing system 7000 can implement a pipelined architecture. The processing system 7000 can be configured to decode and execute instructions of an instruction set architecture (ISA) (e.g., a RISC-V instruction set). The instructions can execute speculatively and out-of-order in the processing system 7000. The processing system 7000 can be a compute device, a microprocessor, a microcontroller, or an IP core. The processing system 7000 can be implemented as an integrated circuit. The processing system 7000 and each element or component in the processing system 7000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The processing system 7000 includes a cluster 7100 which can be connected to a third level power management unit 7200, which can include a power domain sequencer (not shown). The third level power management unit 7200 can be a power microcontroller (PMC). The third level power management unit 7200 can include at least the features and functions described herein for the first level power management unit 2200 and the second level power management unit 5200. The cluster 7100 can be provided power via a power system 7300 as described herein. The cluster 7100 can be provided clock signals from a clock generator 7400.

The cluster 7100 can include one or more cores 1, 2, 3, . . . , n 7500 which can be connected to an uncore 7600. In implementations, n can be 4. Each core 7500 can include ports as described herein and a bus blocker 7510. The power system 7300 can provide separate power rails or power planes 1, 2, 3, . . . , n+1 7310 to each of the cores 1, 2, 3, . . . , n 7500 and the uncore 7600. The third level power management unit 7200 can be connected to and individually and independently control each of the power rails 1, 2, 3, . . . , n+1 7310 as described herein.

The uncore 7600 can include a control interconnection network 7610, a system interconnection network 7620, a front port 7630, a system port 7640, and uncore components (not shown) which can include, but is not limited to, a last level cache, clock circuits, interrupt controllers and circuits, debug circuits, a debug manager, wrappers, command line interrupt circuits and controllers, cache coherence manager, and caches. The control interconnection network 7610 and the system interconnection network 7620 are interconnected. The control interconnection network 7610 and the system interconnection network 7620 can be a chip-scale interconnect such as TileLink as described herein. The front port 7630 and the system port 7640 are connected to the system interconnection network 7620.

The cluster 7100 further includes a bus blocker 7632 connected to the front port 7630 and a bus blocker 7642 connected to the system port 7640. The cluster 7100 can include other ports and bus blockers as shown, for example, in FIG. 2. The bus blockers 7510, 7632, and 7642 can be implemented as described herein.

The third level power management unit 7200 can be connected to the cluster 7100, the cores 7500, and the uncore 7600 via the control interconnection network 7610, the system interconnection network 7620, the front port 7630, and the system port 7640, as appropriate and applicable. In implementations, the third level power management unit 7200 can be connected to the cluster 7100, the cores 7500, and the uncore 7600 via power management ports and an interconnection network (not shown in FIG. 7 but illustrated in FIG. 2).

The third level power management unit 7200 can provide control outside of the power domain (e.g., the core and/or cluster) being powered down to determine when all bus activity has completed and the domain is functionally isolated. The third level power management unit 7200 can communicate with the managed cores and/or clusters through the interconnection networks such as the control interconnection network 7610 and the system interconnection network 7620, via direct control signals, or combinations thereof. In implementations, the third level power management unit 7200 can be connected to the power management resources such as bus blockers, power monitors, temperature sensors, voltage sensors, performance monitors via a separate interconnect network such as power link bus 7220. The third level power management unit 7200 can use a richer set of feedback information with a separate bus to make better power management decisions that optimize the allocation of power to maximize the desired performance response. The separate bus allows scaling of the bus relative to the amount of feedback information. It also avoids any possible interference with operations on the core processor interconnect. A reason to avoid all interference might be in a system that implements redundancy to operate cores in lock step. An interjected power management transaction would break lock step. Other features of the power link bus 7220 are described herein below.

As noted, the third level power management unit 7200 can be connected to and individually and independently control each of the power rails 1, 2, 3, . . . , n+1 7310 to enable or disable one or more of the cores 7500, the uncore 7600, the cluster 7100, or combinations thereof in a sequential manner to avoid power disturbance on the power system 7300.

The third level power management unit 7200 can include a power monitor 7210 in each of the cores 7500. The power monitors (PMON) 7210 are linked together via a power link bus (Plink Bus) 7220 to the third level power management unit 7200. Power control and performance metrics information to and from the third level power management unit 7200 and the power monitors 7210 can be communicated using the power link bus 7220.

The power monitors 7210 can provide a power control loop with respect to the core 7500. In implementations, the power link bus 7220 can be a serial bus. The power monitors 7210 can include counters and weights to enable tracking power activities at each core. For example, the power activities can include energy use, power use, and other usage metrics. Each power activity can be associated with or assigned a weight. For example, the weights can be based on priorities provided by software or the OS. In implementations, the priorities can be based on instruction types, thermal profile, operating frequency, energy requirements, voltage requirements, power requirements, latency, and other similar requirements. The power monitors 7210 can enable more granular visibility into power usage, voltage needs, and/or energy needs, enabling the third level power management unit 7200 to achieve greater energy allocation efficiency in a next operational interval. For example, the third level power management unit 7200 can use the power dial functionality described herein to cap power usage within an allocation.

Figure 8:
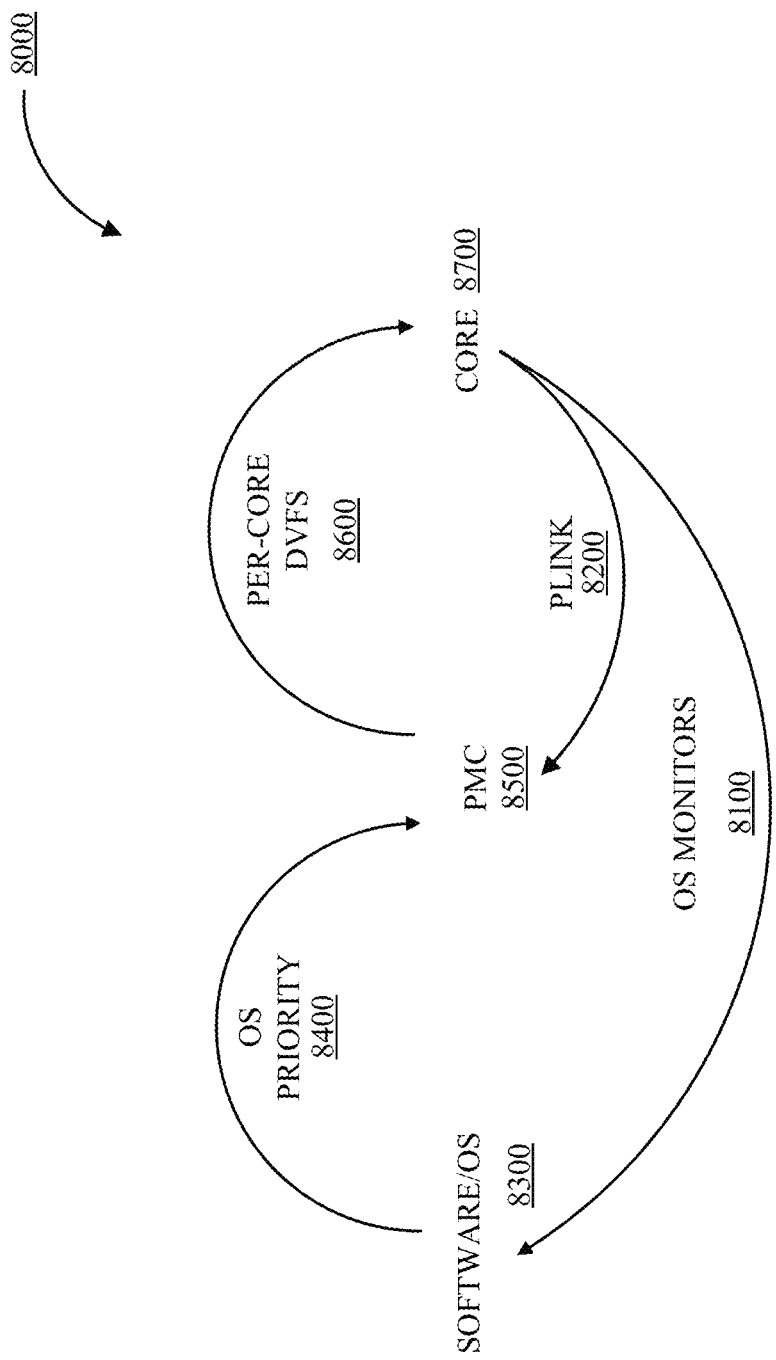
FIG. 8 is a block diagram of an example of a state machine for use in the implementation of FIG. 7 in accordance with embodiments of this disclosure.

The third level power management unit 7200 can implement the state machines as described herein with respect to FIG. 2, FIG. 3, FIG. 4, FIG. 5, and FIG. 6. The third level power management unit 7200 can implement a state machine 8000 as shown in FIG. 8. The state machine 8000 can be implemented as hardware, software, and/or combinations thereof to provide power scaling options.

The state machine 8000 can cycle through multiple states to provide dynamic voltage frequency scaling (DVFS) while accounting for priorities from the SW or OS. In implementations, the DVFS can be provided on a cluster level. In implementations, the DVFS can be provided per core. In implementations, the cores can operate at any unique voltage. This implies that the cores can operate at unique frequencies. The frequency selection may be restricted if rational clock crossings are used (these are called "rational" clock crossing because the ratio of the clocks must be is a rational number). In implementations, asynchronous clock crossings can be used at the cost of latency. Level shifters are circuits that adjust the voltage levels of signals that cross between voltage domains. The state machine 8000 can provide software controlled, operating system (OS) controlled, or combinations thereof power scaling. For example, an OS can monitor one or more cores with respect to power usage, frequency clock, temperature, latency, and other performance measures and metrics (collectively "performance metrics") (8100). The power monitors can provide the performance metrics to the third level power management unit (8200).

Based on the monitored performance metrics (8300) and priorities (8400), the software and/or OS can set a performance operating point for a specific core and communicate same to the third level power management unit ((8500). The third level power management unit can then configure DVFS parameters (8600) and apply same to a core and/or cluster (8700). The process is iterative.

Figure 9:
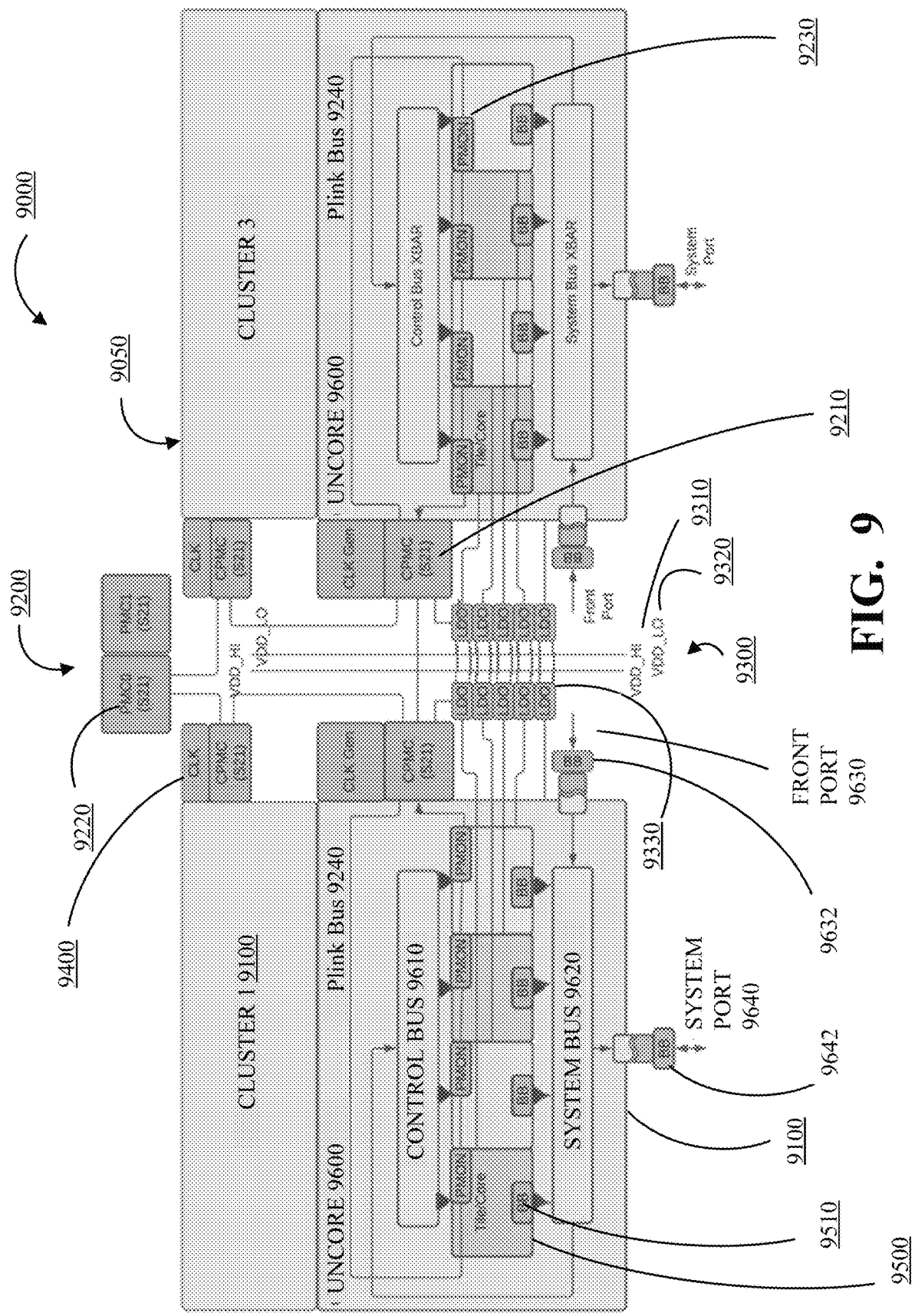
FIG. 9 is a block diagram of an example of a processing system with a third level power management system in accordance with embodiments of this disclosure.

FIG. 9 is a block diagram of an example of a processing system 9000 with a fourth level power management system in accordance with embodiments of this disclosure. The processing system 9000 can implement a pipelined architecture. The processing system 9000 can be configured to decode and execute instructions of an instruction set architecture (ISA) (e.g., a RISC-V instruction set). The instructions can execute speculatively and out-of-order in the processing system 9000. The processing system 9000 can be a compute device, a microprocessor, a microcontroller, or an IP core. The processing system 9000 can be implemented as an integrated circuit. The processing system 9000 and each element or component in the processing system 9000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The processing system 9000 includes a one or complexes, each of which can include one of more clusters 1, 2, 3, . . . , m 9100. Each of the one or complexes 9050 can be connected to a fourth level power management unit 9200, which can include a power domain sequencer (not shown). The fourth level power management unit 9200 can be a power microcontroller (PMC). The fourth level power management unit 9200 can include cluster PMCs (CPMC) 1, 2, 3, . . . , m 9210 and a complex level PMC 9220. In implementations, the complex level PMC 9220 can include two or more power management controllers, such as a PMC0 and a PMC1. In implementations, the PMC0 and PMC1 can perform separate functions. In implementations, the PMC0 and PMC1 can provide more processing power, shared between more than one power management controller while running the same routines similar to a distributed OS. In implementations, tasks running on PMC0 and PMC1 might be dedicated where PMC0 performs the power management control loop to monitor, evaluate, and update the operating conditions for all of the cores, while PMC1 performance communication duties with the OS. In implementations, one of the PMC0 and PMC1 can execute the boot process. Each of the complex level PMCs 9220 in the processing system 9000 can be interconnected. The CPMC 1, 2, 3, . . . , m 9210 in a complex can be interconnected and connected to a respective complex level PMC 9220.

The fourth level power management unit 9200 can include at least the features and functions described herein for the first level power management unit 2200, the second level power management unit 5200, and the third level power management unit 7200. The clusters 9100 can be provided power via a power system 9300 as described herein. Each of the clusters 9100 can be provided clock signals from a clock generator or distribution circuit 9400.

Each of the clusters 9100 can include one or more cores 1, 2, 3, . . . , n 9500 which can be connected to an uncore 9600. In implementations, n can be 4. Each core 9500 can include ports as described herein and a bus blocker 9510. The power system 9300 can include a high power rail 9310 and a low power rail 9320 which are connected via linear dropout regulators 9330 to each of the cores 1, 2, 3, . . . , n 9500 and the uncore 9600. Each CPMC 1, 2, 3, . . . , m 9210 can be connected to and individually and independently control each of the linear dropout regulators 9330 to provide local voltage control.

The uncore 9600 can include a control interconnection network 9610, a system interconnection network 9620, a front port 9630, a system port 9640, and uncore components (not shown) which can include, but is not limited to, a last level cache, clock circuits, interrupt controllers and circuits, debug circuits, a debug manager, wrappers, interrupt circuits and controllers, cache coherence manager, and caches. The control interconnection network 9610 and the system interconnection network 9620 are interconnected. The control interconnection network 9610 and the system interconnection network 9620 can be a chip-scale interconnect such as TileLink as described herein. The front port 9630 and the system port 9640 are connected to the system interconnection network 9620.

Each cluster 9100 further includes a bus blocker 9632 connected to the front port 9630 and a bus blocker 9642 connected to the system port 9640. The cluster 9100 can include other ports and bus blockers as shown, for example, in FIG. 2. The bus blockers 9510, 9632, and 9642 can be implemented as described herein.

The fourth level power management unit 9200 can be connected to the complex 9050, each of the clusters 9100, each of the cores 9500 in each cluster in each complex, and the uncore 9600 in each cluster via the control interconnection network 9610, the system interconnection network 9620, the front port 9630, and the system port 9640, respectively, as appropriate and applicable. In implementations, the fourth level power management unit 9200 can be connected the complex 9050, each of the clusters 9100, each of the cores 9500 in each cluster in each complex, and the uncore 9600 in each cluster via power management ports and an interconnection network (not shown in FIG. 8 but illustrated in FIG. 2).

The fourth level power management unit 9200 can provide control outside of the power domain (e.g., the core, cluster, and/or complex) being powered down to determine when all bus activity has completed and the domain is functionally isolated. The fourth level power management unit 9200 can communicate with the managed cores, clusters and/or complex through the interconnection networks such as the control interconnection network 9610, the system interconnection network 9620, via direct control signals, a power link bus 9240, or combinations thereof.

As noted, the CPMC 1, 2, 3, . . . , m 9210 can be connected to and individually and independently control each of the linear dropout regulators (LDOs) 9330, respectively, to enable or disable one or more of the cores 9500, the uncore 9600, the cluster 9100, or combinations thereof in a sequential manner to avoid power disturbance on the power system 9300 and to provide customized voltages to each of the cores 9500 or the uncore 9600. The CPMC control of the LDOs can provide fine level control within a cluster of coarse level power or voltage distribution from external supplies. That is, a two tier or two level power distribution can be provided.

The fourth level power management unit 9200 can include a power monitor 9230 in each of the cores 9500. The power monitors (PMON) 9230 are linked together via a power link bus (Plink Bus) 9240 to a respective CPMC 1, 2, 3, . . . , m 9210. Power control and performance metrics to and from the respective CPMC 1, 2, 3, . . . , m 9210 and the power monitors 9230 can be communicated using the power link bus 9240. In implementations, the power link bus 9240 can be a serial bus.

The power monitors 9230 together with the respective CPMC 1, 2, 3, . . . , m 9210 can provide a power control loop with respect to each of the cores 9500 in a cluster 9100. The power monitors 9210 can include counters and weights to enable power tracking activity at each core. For example, the power tracking activities can include energy use, power measurements, thermal measurements, performance data, and other metrics. Each power tracking activity can be associated with or assigned a weight. For example, the weights can be based on priorities provided by software or the OS. In implementations, the priorities can be based on instruction types, thermal profile, operating frequency, energy requirements, voltage requirements, power requirements, and other similar requirements. The power monitors 9230 can enable more granular visibility into power usage, voltage needs, and/or energy needs, enabling the respective CPMC 1, 2, 3, . . . , m 9210 to achieve greater energy allocation efficiency in a next operational interval. For example, the respective CPMC 1, 2, 3, . . . , m 9210 can use the power dial functionality described herein to cap power usage within an allocation.

The CPMC 1, 2, 3, . . . , m 9210 together with the respective complex PMC 9220 can provide a further power control loop with respect to each of the cores 9500 in a cluster 9100, the clusters 9100, and the complex 9050 in the processing system 9000. The PMCs 9220 can use the information from each of the CPMCs 1, 2, 3, . . . , m 9210 in each of clusters controlled by the complex PMC 9210 to determine affects of powering up, powering down, increased power usage, decreased power usage, and other measures have on a power grid of the processing system 9000. The PMCs 9220 can have approval authority on threshold items and the CPMCs 1, 2, 3, . . . , m 9210 can have autonomy on non-threshold items. For example, threshold items can be actions which cause voltage changes in an area above a defined threshold which can affect the power system 9300.

Figure 10:
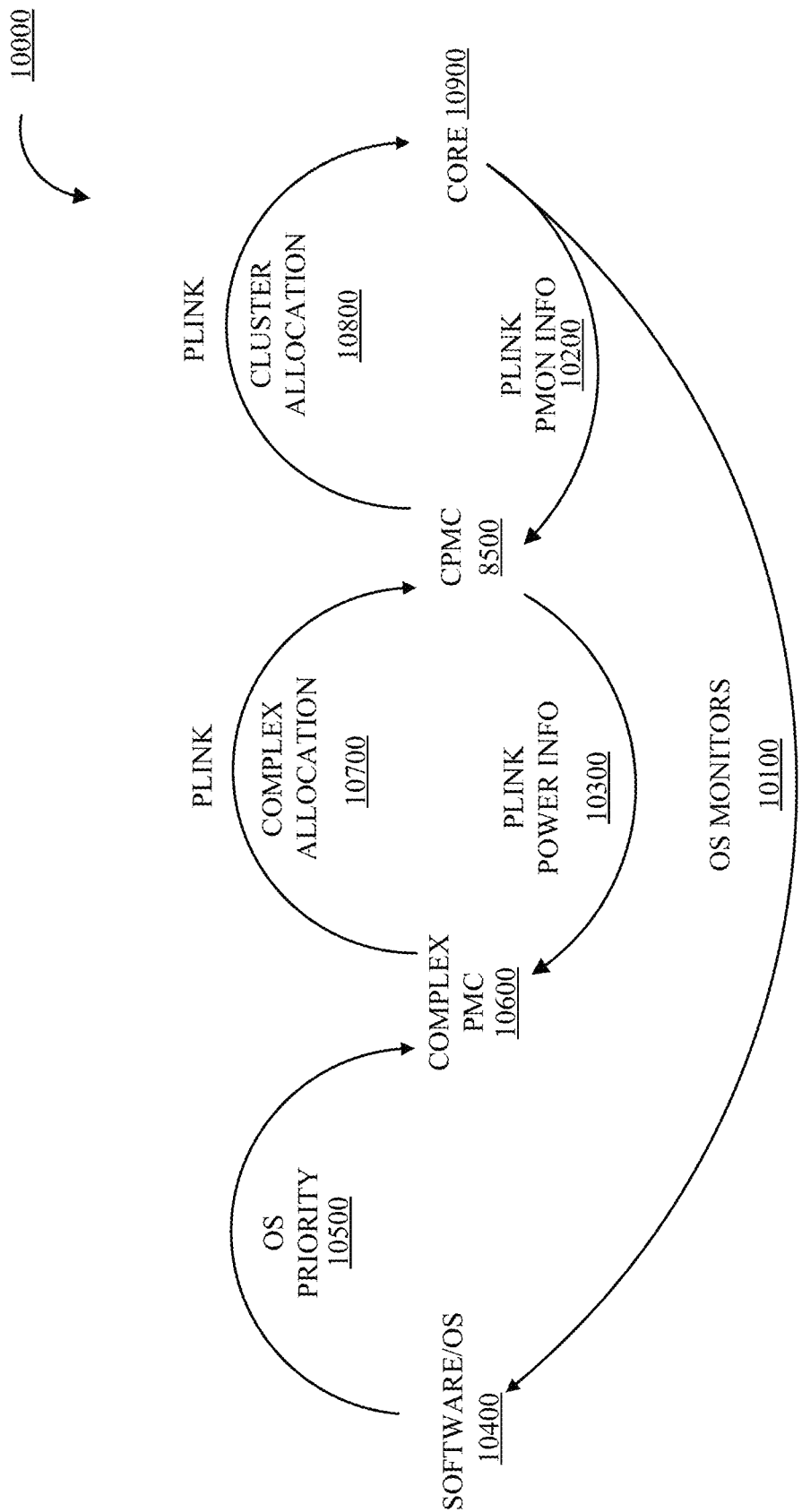
FIG. 10 is a block diagram of an example of a state machine for use in the implementation of FIG. 9 in accordance with embodiments of this disclosure.

The fourth level power management unit 9200 can implement the state machines as described herein with respect to FIG. 2, FIG. 3, FIG. 4, FIG. 5, FIG. 6, FIG. 7 and FIG. 8. The fourth level power management unit 9200 can implement a state machine 10000 as shown in FIG. 10. The state machine 10000 can be implemented as hardware, software, and/or combinations thereof to provide power scaling options.

The state machine 10000 can cycle through multiple states to provide power allocation and scaling while accounting for priorities from the SW or OS. The state machine 10000 can provide software controlled, operating system (OS) controlled, or combinations thereof power allocation and scaling. For example, an OS can monitor one or more cores with respect to power usage, frequency clock, temperature, latency, and other performance measures and metrics (collectively "performance metrics") (10100). Each power monitor in a cluster can provide the performance metrics to a cluster level PMC or CPMC over a Plink (10200). Each CPMC in a complex can provide performance metrics and other power information to the complex or SoC level PMC (complex PMC) over the Plink (10300).

Based on the monitored performance metrics (10400) and priorities (10500), the software and/or OS can set a performance operating point for a specific core and communicate same to the complex PMC ((10600). The performance operating point may consist of a voltage, frequency pair, or a reconfiguration of the hardware to achieve a desired level of power efficiency. For instance, a vector processing unit or other hardware reconfiguration may be enabled and powered only when the desired level of power efficiency is expected to be achieved based on the performance metrics received from previous iterations of the control loop. The complex PMC can use the performance operating point information and the performance metrics and other power information from the CPMCs to determine and send a complex level power allocation to each of the CPMCs over the Plink (10700). Each CPMC can allocate power (10800) and apply same to a core (10900). The process is iterative.

The CPMC 1, 2, 3, . . . , m 10210 and the complex PMC 10220 provide a hierarchical power management architecture where each respective complex PMC 10220 allocates energy to a region or power domain based on power information from respective CPMCs 1, 2, 3, . . . , m 10210. Power and performance trade-offs can be handled by the respective CPMCs 1, 2, 3, . . . , m 10210 subject to power grid affects. That is, each CPMC performs as a power balancer within the cluster.

As described, each of the first level power management unit 2200, the second level power management unit 5200, the third level power management unit 7200, and the fourth power management unit 9200 can provide a greater level of power management control. Algorithms in the power management loops can use no feedback as in the first level power management unit 2200 and increased levels of feedback as in fourth power management unit 9200. The algorithms used for power management depend on the complexity of the power management unit. The algorithms can be directed to and/or include maximizing performance, efficiency, P-state, performance range, transient temperature and frequency headroom utilization (burst mode), user performance metrics, and/or combinations thereof. In implementations, power management progression can include a first level which provides a means of controlling power use without changing voltage or frequency (useful for very low cost systems), a second level which provides a means of controlling power use with separate power domains by power gating and changing frequency, but not changing voltage, a third level which provides a means of controlling power use with separate power domains by power gating and changing both voltage and frequency, and a fourth level which provides a means of controlling power use with hierarchical power domains and controllers. Each level uses additional performance metric feedback information to increasingly tune the performance operating point of the hardware to utilize available energy and power in the most efficient manner to achieve the performance goals.

Figure 11:
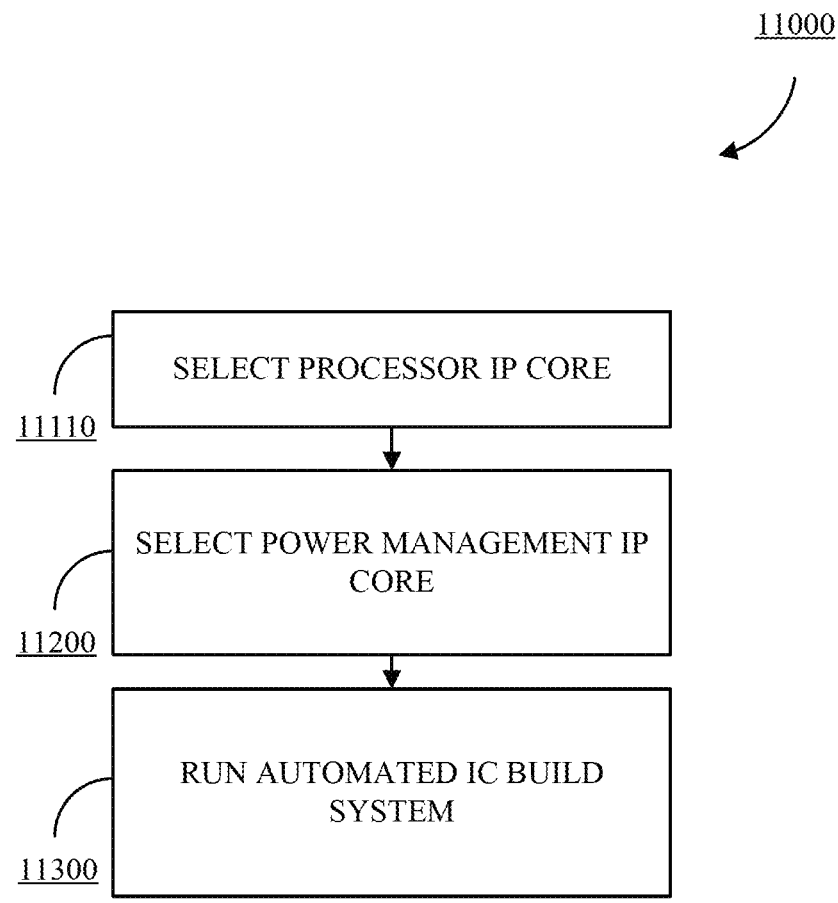
FIG. 11 is a flowchart of an example technique or method for selecting a power management system in accordance with embodiments of this disclosure.

FIG. 11 is a diagram of an example technique 11000 for power management IP core selection in accordance with embodiments of this disclosure. The technique 11000 includes: selecting 11100 a processor IP core; selecting 11200 a power management IP core; and running 11300 an automated integrated circuit build system. The technique 11000 can be implemented, for example, in the system 1000 to build the processing system 2000, the processing system 5000, the processing system 7000, and the processing system 9000, as appropriate and applicable.

The technique 11000 includes selecting 11100 a processor IP core and selecting 11200 a power management IP core. An automated integrated circuit build system can provide a web interface for parameter selection for building of a processing system, SoC, and/or integrated circuit. This can include selection of a processor IP core and a power management IP core. The power management IP core can at least include any of the power management units described herein and variations thereof.

The technique 11000 includes running 11300 an automated integrated circuit build system. Once the processor IP core and the power management IP core are selected along with other design parameters, the automated integrated circuit build system can output an integrated circuit design or SoC based on the selected processor IP core and the selectable power management IP core.

Figure 12:
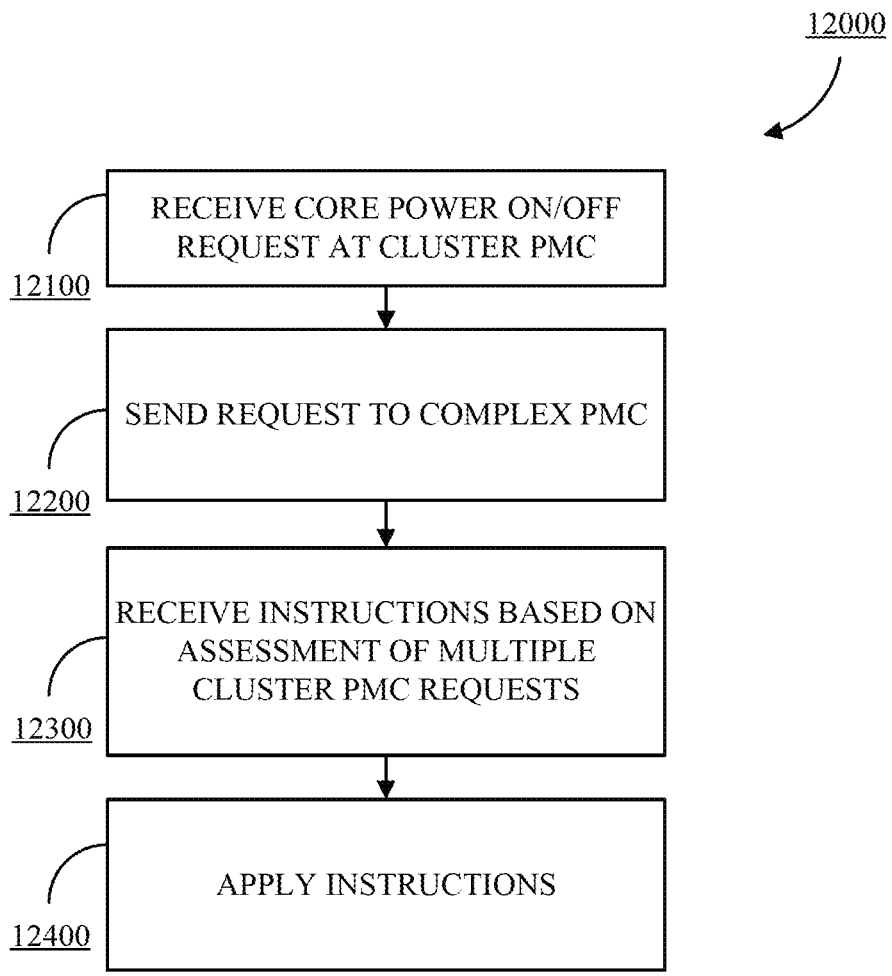
FIG. 12 is a flowchart of an example technique or method for hierarchical power management in accordance with embodiments of this disclosure.

FIG. 12 is a diagram of an example technique 12000 for power management control in accordance with embodiments of this disclosure. The technique 12000 includes: receiving 12100 one or more core power on/off requests at a cluster power management controller; sending 12200 the one or more core power on/off requests to a complex power management controller; receiving 12300 instructions from complex power management controller; and applying 12400 the instructions to cores in a cluster. The technique 12000 can be implemented, for example, in the processing system 9000, as appropriate and applicable.

The technique 12000 includes receiving 12100 one or more core power on/off requests at a cluster power management controller. A processing system an include one or more complexes. Each complex can include one or more clusters. Each cluster can include one or more cores. Powering on/off requests can come from multiple cores throughout the processing system.

The technique 12000 includes sending 12200 the one or more core power on/off requests to a complex power management controller. Each cluster power management controller can send received powering on/off requests to an associated complex power management controller.

The technique 12000 includes receiving 12300 instructions from complex power management controller. The complex power management controller can assess the impact of the powering on/off requests on a power delivery system or power grid of the processing system. The complex power management controller can determine which powering on/off requests can be performed. In implementations, the complex power management controller can indicate that the powering on/off request can be performed in a later operating cycle to balance minimize fluctuations. In this instance, the cluster power management controller can make final determination.

The technique 12000 includes applying 12400 the instructions to cores in a cluster. The cluster power management controller can apply the instructions received from the complex power management controller as appropriate. This can include powering up a core or powering down a core.

Figure 13:
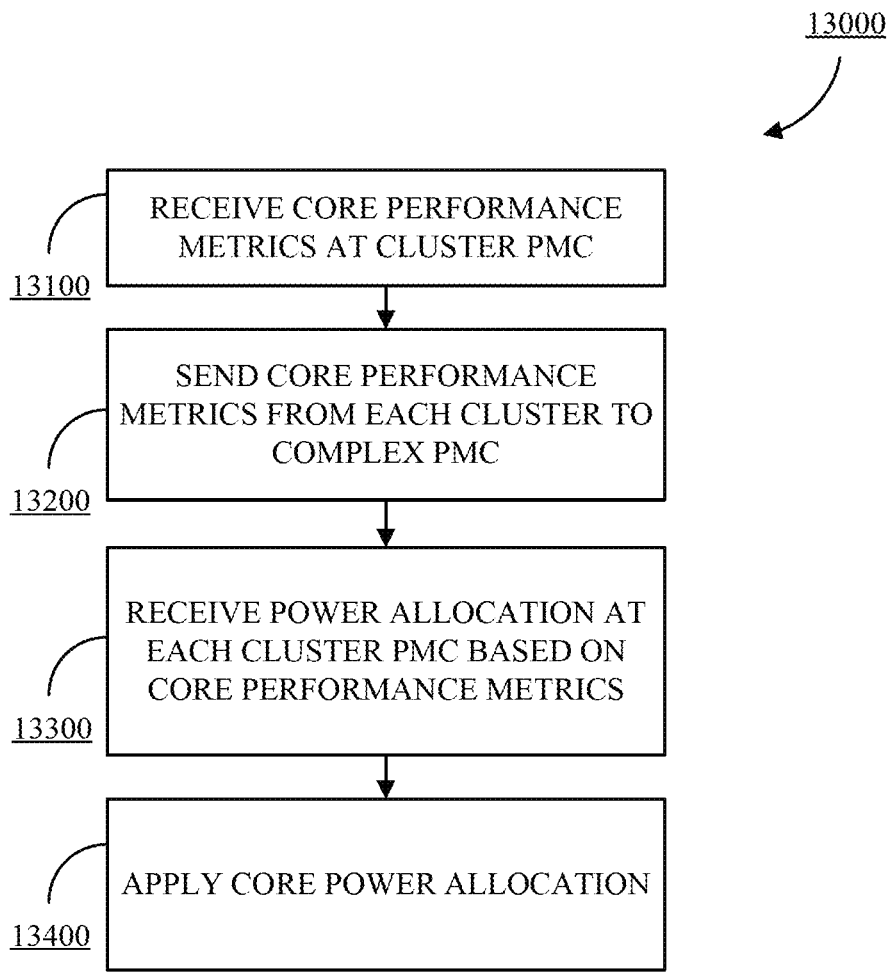
FIG. 13 is a flowchart of an example technique or method for hierarchical power management in accordance with embodiments of this disclosure.

FIG. 13 is a diagram of an example technique 13000 for power management control in accordance with embodiments of this disclosure. The technique 13000 includes: receiving 13100 one or more core performance metrics at a cluster power management controller; sending 13200 the one or more core performance metrics by each cluster power management controller to a complex power management controller; receiving 13300 a power allocation at each cluster power management controller from the complex power management controller; and applying 13400 core power allocations based on the power allocations to cores in each cluster. The technique 13000 can be implemented, for example, in the processing system 9000, as appropriate and applicable.

The technique 13000 includes receiving 13100 one or more core performance metrics at a cluster power management controller. A processing system an include one or more complexes. Each complex can include one or more clusters. Each cluster can include one or more cores. Each core can include a power monitor which can send performance metrics to the cluster power management controller.

The technique 13000 includes sending 13200 the one or more core performance metrics to a complex power management controller. Each cluster power management controller can send the one or more core performance metrics to an associated complex power management controller.

The technique 13000 includes receiving 13300 a power allocation at each cluster from complex power management controller. The complex power management controller can assess power allocations based one or more core performance metrics received from one or more cluster power management controllers and on an impact to a power grid. The complex power management controller can provide a coarse level power allocation to each cluster power management controller.

The technique 13000 includes applying 13400 core power allocations based on the power allocations to cores in each cluster. The cluster power management controller can apply the power allocation received from the complex power management controller based on the performance metrics as described herein.

Figure 14:
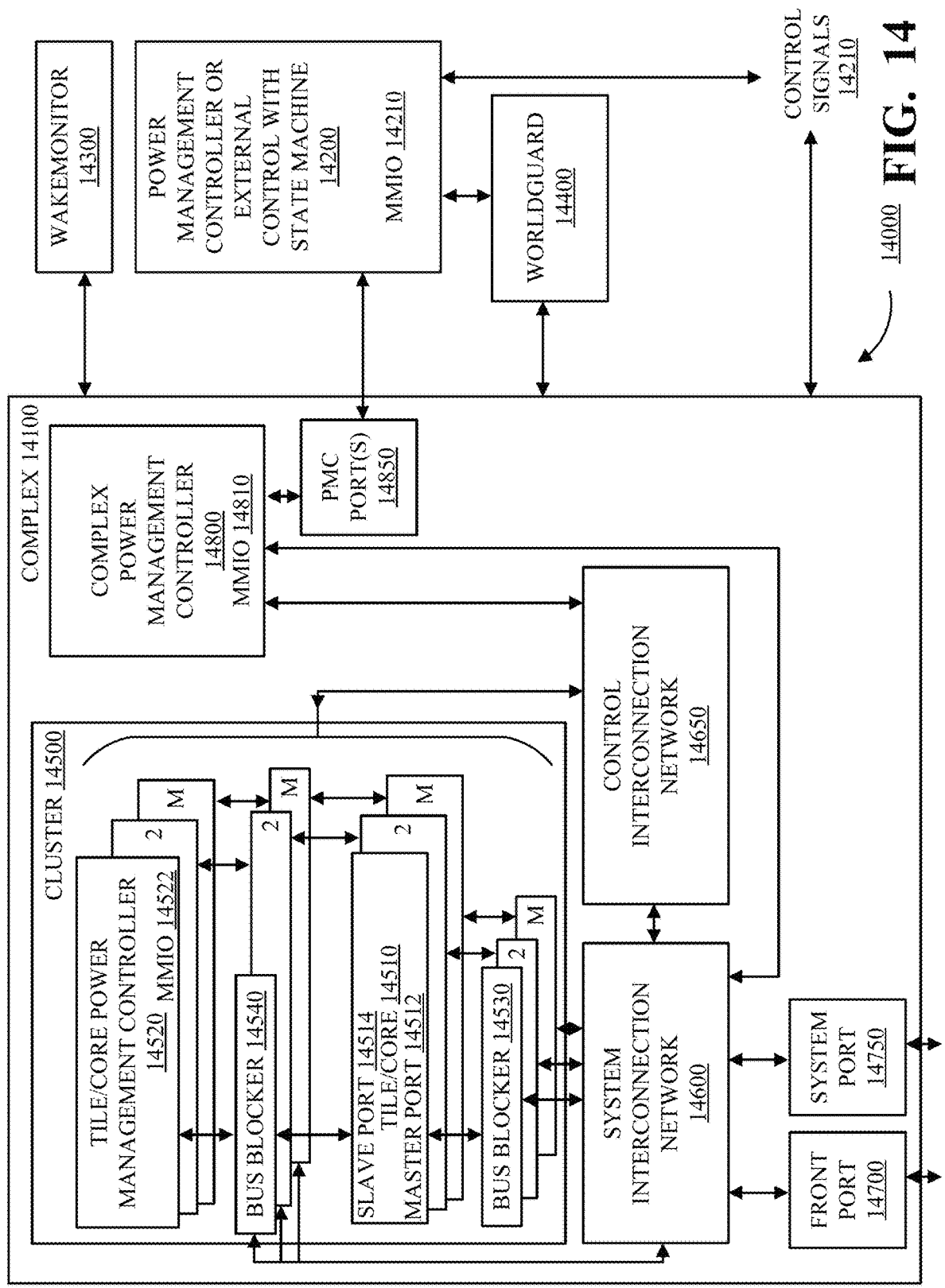
FIG. 14 is a block diagram of an example of a processing system with a distributive power management system in accordance with embodiments of this disclosure.

FIG. 14 is a block diagram of an example of a processing system 14000 with a distributed power management system in accordance with embodiments of this disclosure. The processing system 14000 can include or implement complex power gating, per tile or core power gating, and wait-for-interrupt clock gating for uncores. Power gating is a method for isolating and removing power from a portion of an SoC while other portions remain fully powered and functional. The purpose of power gating is to eliminate all or substantially all static and dynamic power from portions of a design that are not needed for a period of time. For example, per-core/per-tile power gating can remove an idle core from the power rail and per-cluster power gating can remove all cores within a cluster plus the uncore components from the power rail, which in some implementations can include removing a last level cache from the power rail. Power gating techniques are described in U.S. Patent Application No. 63/221,208, filed Jul. 13, 2021, and entitled "SYSTEMS AND METHODS FOR POWER GATING CHIP COMPONENTS", the contents of which are herein incorporated by reference in its entirety.

The processing system 14000 can implement a pipelined architecture. The processing system 14000 can be configured to decode and execute instructions of an instruction set architecture (ISA) (e.g., a RISC-V instruction set). The instructions can execute speculatively and out-of-order in the processing system 14000. The processing system 14000 can be a compute device, a microprocessor, a microcontroller, or an IP core. The processing system 14000 can be implemented as an integrated circuit. The processing system 14000 and each element or component in the processing system 14000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

The processing system 14000 includes a complex 14100 which can be connected to a power management controller or unit 14200, a wakemonitor 14300, and a worldguard module 14400. The power management unit 14200 can be a power microcontroller (PMC) and/or external hardware or logic with a state machine as described herein (collectively PMC 14200). The PMC 14200 can include memory mapped input/output (MMIO) registers 14210.

The complex 14100 can include a cluster 14500 connected to a system interconnection network 14600 and a control interconnection network 14650, which are interconnected. The control interconnection network 14600 and the system interconnection network 14650 can be a chip-scale interconnect such as TileLink as described herein. A front port 14700 and a system port 14750 are connected to the system interconnection network 14600. In contrast to other processing systems described herein, the front port 14700, the system port 14750, and other complex ports do not use bus blockers. In this implementation, the complex is completely acquiesced before power gating, making transactions leaving a tile/core, cluster, or complex impossible.

The complex 14100 also includes a complex PMC (CPMC) 14800, which is connected to the control interconnection network 14650, the system interconnect 14600, and to a PMC port(s) 14850, which in turn is connected to the PMC 14200. The CPMC 14800 can include MMIO registers 14810. The MMIO registers 14810 can include MMIO registers connected to the PMC 14200 and MMIO registers connected to the worldguard module 14400. The complex 14100 can include other components including, but not limited to, a last level cache, clock circuits, interrupt controllers and circuits, debug circuits, a debug manager, wrappers, command line interrupt circuits and controllers, cache coherence manager, and caches.

The cluster 14500 can include tiles or cores 1, 2, . . . , M 14510, each of which include a master port 1, 2, . . . , M 14512 and a slave port 1, 2, . . . , M 14514. Each master port 1, 2, . . . , M 14512 is connected to the system interconnection network 14600 via a corresponding bus blocker 1, 2, . . . , M 14530. The cluster 14500 can include tile or core PMCs (TPMC) 1, 2, . . . , M 14520, each of which include MMIO registers 14522. The MMIO registers 14522 can include MMIO registers connected to the PMC 14200 and MMIO registers connected to the worldguard module 14400. Each TPMC 1, 2, ..., M 14520 is connected to a corresponding slave port 1, 2, ..., M 14514 via a corresponding bus blocker 1, 2, ..., M 14540. The bus blockers 1, 2, ..., M 14530 and 1, 2, ..., M 14540 can be implemented as described herein. Each TPMC 1, 2, ..., M 14520 is or implements an internal finite state machine (IFSM) as described herein. Each of the TPMC 1, 2, ..., M 14520, the bus blocker 1, 2, ..., M 14540, the tiles or cores 1, 2, ..., M 14510, and the bus blocker 1, 2, ..., M 14530 are connected to and controlled via the control interconnection network 14650. Each of the bus blocker 1, 2, ..., M 14540 and the bus blocker 1, 2, ..., M 14530 are connected to the system interconnection network 14600.

The worldguard module 14400 appends WIDs or address tags to define a series of worlds with separate trust levels for access to world elements (resources, code, data). WorldGuardmarkers (WG-m) and checkers (WG-c) are used to append and check WIDs in hardware. WIDs are appended by WG-m's near bus masters for hardware accesses or by a WG-m inside each core for software accesses. Power management MMIO blocks are protected by WG-c's which reject traffic that does not match a WID assigned to these resources. WorldGuard markers and checkers for power gating resources are included inside and outside the core complex. Software accessible MMIO registers, such as the MMIO registers 14210, the MMIO registers 14810, and the MMIO registers 14522 can use WG-c to check inbound transactions marked from within the core/tile. Transactions initiated by the CPMC 14800 and/or the TPMC 1, 2, ..., M 14520 are marked by a WG-m inside the complex and checked by a WG-c protecting external MMIO registers 14210. Markers and checkers may be programmed at boot time, but in some instances, reprogramming may be desired for improved security. For example, a WG-c on the tile slave port may be programmed at boot to allow multi-tile access, but later reprogramed to restrict access to an individual tile for a power gate flow. For example, tile or complex state being save/restored in the power gate flow must not be updated after it has been saved, and cache configuration state should never be modified during the power gate cache flush.

The wakemonitor 14300 can capture interrupts while the tile/core(s) 14510, cluster(s) 14500, and/or complex(es) 14100 is powered off and generate a wake signal. The wakemonitor 14300 both diverts new external interrupts to allow a safe period for software to complete the power gate steps and provides a wakeup signal. The wakeup signal can be sampled prior to a final power gate step and used as an input to a TPMC 1, 2, ..., M 14520 (IFSM) and/or CPMC 14800 after a power down.

Power gating for the processing system 14000 is cooperatively controlled between the PMC 14200, appropriate ones of the TPMC 1, 2, ..., M 14520, the CPMC 14800, and the wakemonitor 14300. Each TPMC 1, 2, ..., M 14520 communicates with the PMC 14200, which controls clocks, reset, isolation and power switch enables (via for example control signals 14210), to complete a power gating sequence. At a high level, core software and/or operating system uses or sets the MMIO registers 14810 and/or the MMIO registers 14522 to initiate power gating operations. The appropriate TPMC 1, 2, ..., M 14520 and/or the CPMC 14800 issue commands the MMIO registers 14210 in the PMC 14200, which in turn executes commands to power gate as appropriate.

Power gating sequences include power gating preparation, software flush, and power gating. The power gating preparation can include, but is not limited to, software or operating system (O/S) preparation, state and resume program count (PC) storage, interrupt affinity reassignment, divert or mask interrupts to a power gated region to manage wakeup conditions, configure a wakeup interrupt, service outstanding interrupts, software/OS to mask or disable all tile-internal interrupt sources, quiesce inbound ports that can update internal states, enable the wakemonitor 14300, and for the TPMC 1, 2, ..., M 14520 and/or the CPMC 14800 to request an acknowledgement to proceed from the PMC 14200 by writing the MIMO registers 14210. The PMC 14200 confirms that slave port to the tile (e.g., slave port 14514, if present, has been quiesced before sending the acknowledgement. Quiescing the slave port 14514 may use an external bus blocker or other means to stop traffic on the slave port 14514. An error may be returned to cause power gating preparation to fail. Once the wakemonitor 14300 is enabled, interrupts are not delivered to appropriate tile/core 14510. Once the PMC 14200 acknowledges power gating preparation complete to the TPMC 1, 2, ..., M 14520 and/or the CPMC 14800, the TPMC 1, 2, ..., M 14520 and/or the CPMC 14800 wait for the software or 0/S (collectively "software") to continue the power gating sequence. In implementations, the software runs on the core/tile in question.

The software proceeds to perform a software flush once power gating preparation is signaled complete. The software flush can include, but is not limited to, flushing private or unique state (e.g., cache) and reverting to preparation on error or a late interrupt. The power gating flush can include, but is not limited to, completing instruction processing and confirming idle conditions to quiesce remaining ports, and requesting power down to the PMC 14200.

Power gating of the tile can occur after successful power gating flush.

Figure 15:
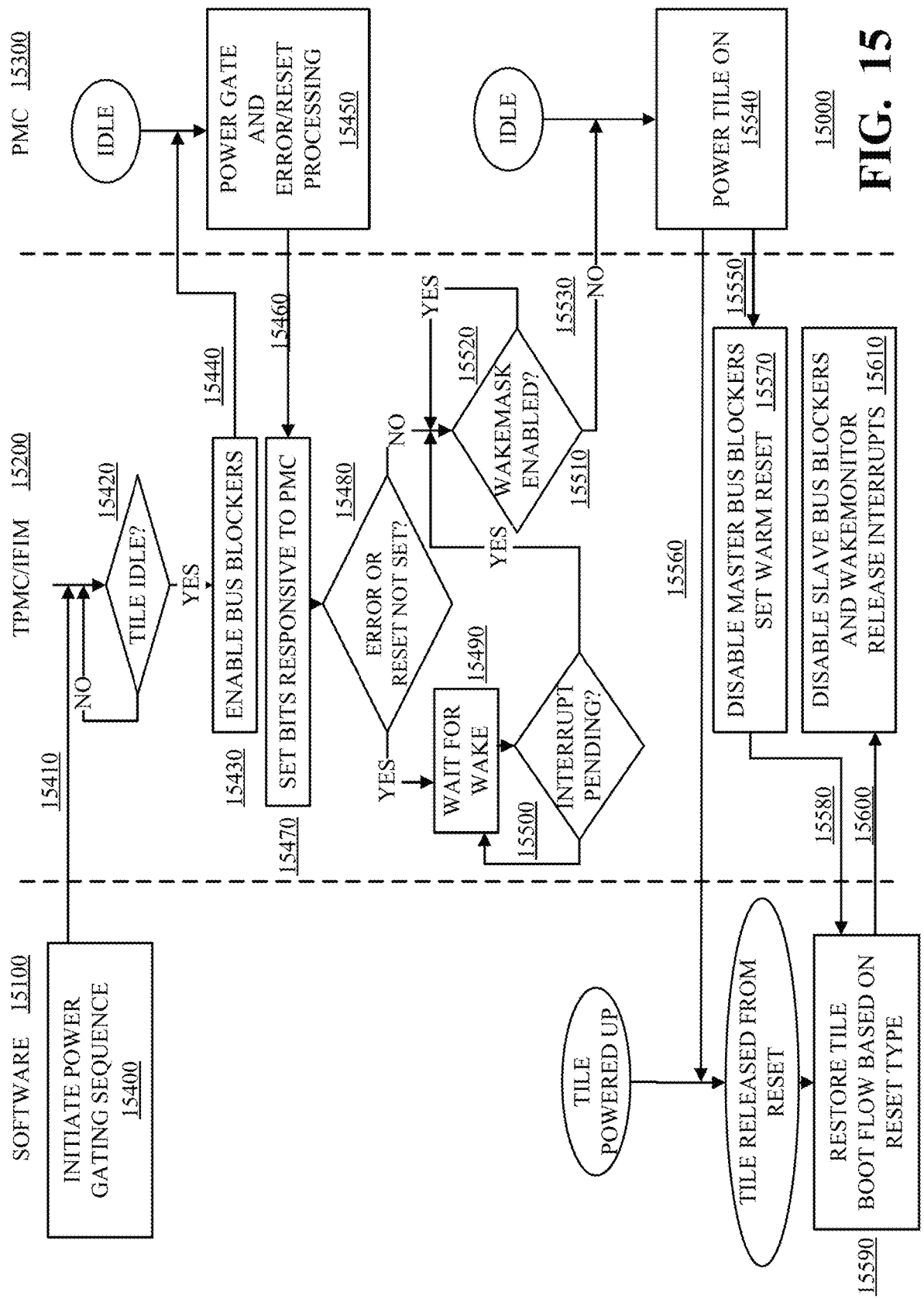
FIG. 15 is a block diagram of an example power gating transition for the distributive power management system of FIG. 14 in accordance with embodiments of this disclosure.

FIG. 15 is a block diagram of an example power gating flow 15000 for the distributive power management system of the processing system 14000 of FIG. 14 in accordance with embodiments of this disclosure. The power gating flow 15000 is cooperatively performed by software 15100, TPMC 15200, and PMC 15300.

The software 15100 can initiate the power gating sequence (15400) and send a command, instruction, or message to the TPMC 15200 and/or set a MMIO register at the TPMC 15200 (collectively "signal"), as applicable (15410). For example, a CEASE command can be sent. The TPMC 15200 can check whether the tile is idle (15420). If not idle, continue checking until tile is idle or timeout, if implemented. If the tile is idle, the TPMC 15200 enables the master port and slave port bus blockers and sets power gating enable and reset bits, as appropriate (15430). The TPMC 15200 can signal the PMC 15300 when ready (15440). The PMC 15300 can execute power gating, including but not limited to, functionally and electrically isolating tile, gating the clock, asserting isolation, and asserting reset (15450). The PMC 15300 can power gate the tile. The PMC 15300 can set an enablement bit and an error bit, as appropriate. The PMC 15300 can signal the TPMC 15200 as appropriate (15460).

The TPMC 15200 can process the signal from the PMC 15300 (15470) and determines whether an error has occurred or a reset has been enabled (15480). If an error or reset is set or enabled, the TPMC 15200 can proceed to disable power gating. If neither an error or reset is set or enabled, the TPMC 15200 can wait for a wake signal from a wakemonitor (15490) and loop through as needed (15500). If a wake signal is received, the TPMC 15200 can proceed to disable power gating.

A wake mask is used for complex power gating as described herein. The wake mask enables coordination between a master core/tile and slave cores/tiles. If a complex containing more than one core/tile is being power gated, the TPMC 15200 can check if a wake mask has an enable set (15510) and loop through as needed (15520). If a wake mask is not enabled, allowing the core/tile to proceed with wake-up, the TPMC 15200 signals the PMC 15300 (15530). That is, the check 15510 and loop 15520 stops a core/tile from proceeding so a master tile sequence can proceed knowing that none of the slave cores/tiles will be allowed to wake-up while the master core/tile is preparing the complex to power gate. The master core/tile may detect the core/tile wake-up condition and abort the complex power gating down, but a slave core/tile will not wake-up while the master core/tile is attempting to power gate the entire complex The PMC 15300 enables power in the tile, e.g., enable clock, de-assert isolation and the like (15540). The PMC 15300 signals the TPMC 15200 (15550) and the software 15100 when ready (15560). The TPMC 15200 disables a master bus blocker and sets a warm reset enable (15570). Disablement of the master bus blocker permits tile write operations to restore cache, program count, and the like. Maintaining the slave bus blocker prevents access by external components to the tile while it is still in the process of being powered up. This allows the tile to be stable during repowering and rebooting absent, for example, having to deal with interrupts or other issues. The TPMC 15200 signals the software 15100 when ready (15580). The software 15100 can execute a boot flow for the warm reset and restore tile as appropriate (15590). The software 15100 can signal the TPMC 15200 when ready (15600). The TPMC 15200 can disable the slave bus blocker and wakemonitor and release interrupts accordingly (15610).

In implementations, power gating of the processing system 14000 can include power gating the complex 14100. This can be implemented by selecting a master core, which in turn power gates the slave cores as described herein with appropriate signaling between the software, the CPMC 14800, and the PMC 14200. As noted, the check 15510 and loop 15520 is used during power gating of the complex 14100. A complex, such as the complex 14100, containing more than one core/tile, such as the tiles or cores 1, 2, . . . , M 14510, can be power gated using a master and slave cores by forcing all slave cores into a power gated state before the master core executes a final power gating sequence for itself and all shared states and/or components, such as a shared cache within the complex. The power gating sequence for a slave core is as described in FIG. 14 subject to additional interactions between the master core and the slave cores as described herein.

For power gating the complex, a master core (e.g., one core selected from among tiles or cores 1, 2, . . . , M 14510) can detect slave cores that have not begun executing a power gating sequence and initiate a power gating sequence on them. The detection can use a semaphore operation between the master core and slave cores, if necessary, so that only slave cores that are not already executing a power gating sequence are requested to initiate a sequence. The master core can enable a wake mask to inhibit slave cores from exiting a power gated state regardless of the presence of a wake-up trigger. The master core can detect when all slave cores are in a power gated state before starting the master core power gating sequence. The master core can flush all core-local and shared states and/or components from the complex to prepare the complex for power gating. The master core can configure a wake-up monitor to trigger a power up for the complex following an interrupt or other activity requiring complex operation. The master core can complete a power gating sequence using a PMC, such as the PMC 14200, to control the reset, isolation, power gate switch controls and clocks for the complex.

In general, a processing system includes one or more cores and a power management unit connected to the one or cores. The power management unit is selected from one of: a first level power management unit when the one or more cores is a core, the first level power management unit configured to power scale the core, a second level power management unit when the one or more cores is two or more cores in a cluster, the second level power management unit configured to independently control power from a shared cluster power supply to each core of the two or more cores, a third level power management unit when each core of the two or more cores includes a power monitor, each power monitor configured to track power performance metrics of an associated core; and q fourth level power management unit when a complex includes multiple clusters and each cluster includes a set of the one or more cores, the fourth level power management unit including a complex power management unit and a cluster power management unit for each of the multiple clusters, the complex power management unit and cluster power management units providing two-tier power management for power allocation and core performance, where each higher level power management unit includes power management functionality of lower level power management units.

In some implementations, the first level power management unit is configured to receive a performance operating point for the core from an operating system and apply a power dial based on the performance operating point to power scale the core. In some implementations, the second level power management unit is configured to receive a performance operating point for each core from an operating system and apply dynamic frequency scaling based on the performance operating point to power scale each core. In some implementations, the third level power management unit is configured to receive a performance operating point for each core from an operating system and apply dynamic voltage frequency scaling based on the performance operating point to power scale each core. In some implementations, each core has an independent power line and the third level power management unit is connected to each independent power line, the third level power management unit configured to control each independent power line. In some implementations, power monitors are connected to one of the third level power management unit or the fourth level power management unit, and uses a power link to communicate the power performance metrics. In some implementations, each power monitor tracks power activities. In some implementations, each power activity has a weight assigned by an operating system based on a performance criteria. In some implementations, the processing system includes a high power rail, a low power rail, and linear dropout regulators for each cluster, each linear dropout regulator connected to the high power rail, the low power rail, one core of a respective cluster, and a respective cluster power management unit, where the respective cluster power management unit is configured to customize power to each core in the respective cluster based on at least the power performance metrics. In some implementations, the complex power management unit is configured to allocate power to each core based on assessing power requirements received from the cluster power management units and each cluster power management unit configured to balance the power allocation among respective cores based on at least the power performance metrics. In some implementations, the two-tier power management enables the complex power management unit to assess power allocation with respect to a power grid for the complex and provides autonomy to each cluster power management unit to balance power distribution within a respective cluster. In some implementations, power management granularity increases going from a lower level power management unit to a higher level power management unit.

In general, a method for power management includes providing multiple power management cores for integration with a selected processor core. The multiple power management cores include a first power management core configured to power scale a core, a second power management core configured to independently control power from a shared power supply to multiple cores in a cluster, a third power management core including power monitors, each power monitor configured to track power performance metrics of an associated core, and a fourth power management core including a complex power management unit and a cluster power management unit for each cluster in a complex, wherein the complex power management unit and cluster power management units enable hierarchical power management for power allocation in the complex and balanced power delivery in each cluster.

In some implementations, the method further includes with respect to at least the first power management core: receiving a performance operating point for the core from an operating system and applying a power dial based on the performance operating point to power scale the core. In some implementations, the method further includes with respect to at least the second power management core: receiving a performance operating point for each core from the operating system and applying dynamic frequency scaling based on the performance operating point to power scale each core. In some implementations, the method further includes with respect to at least the third power management core: receiving a performance operating point for each core from the operating system and apply dynamic voltage frequency scaling based on the performance operating point to power scale each core. In some implementations, the method further includes with respect to at least the third power management core: independently controlling a power line associated with each core based on the power performance metrics. In some implementations, the method further includes with respect to at least the third power management core: providing a power link to communicate the power performance metrics between the power monitors and at least the third power management core. In some implementations, the complex power management unit is configured to allocate power to each core based on assessing power requirements received from the cluster power management units and each cluster power management unit configured to balance the power allocation among respective cores based on at least the power performance metrics. In some implementations, the method further includes power management granularity increases going from a lower power management core to a higher power management core.

In general, a processing system includes one or more cores and a power management unit connected to the one or cores. The power management unit is selected from one of: a first level power management unit when the one or more cores is a core, the first level power management unit configured to control power use without changing voltage or frequency, a second level power management unit when the one or more cores is two or more cores in a cluster, the second level power management unit configured to control power use with separate power domains by power gating and changing frequency and not changing voltage; a third level power management unit when each core of the two or more cores includes a power monitor, each power monitor configured to control power use with separate power domains by power gating and changing both voltage and frequency, and a fourth level power management unit when a complex includes multiple clusters and each cluster includes a set of the one or more cores, the fourth level power management unit including a complex power management unit and a cluster power management unit for each of the multiple clusters, the complex power management unit and cluster power management units controlling power use with hierarchical power domains and controllers, where each higher level uses additional performance metric feedback information to increasingly tune the performance operating point of hardware to utilize available energy and power in an efficient manner to achieve the performance goals.

In general, a processing system includes one or more cores, each core including a core power management unit and a power management unit connected to the one or cores and to each core power management unit, wherein power gating of a core is cooperatively executed by the power management unit, a core power management unit associated with the core, and software, and wherein, for enabling power gating of the core, the core power management unit associated with the core is configured to: receive a power gating command from the software to power gate the core, enable a master bus blocker and slave bus blocker associated with the core, and send command to the power management unit to power gate the core and where, for disabling power gating of the core, the core power management unit associated with the core is configured to: send a command to the power management unit disable the power gating and power on the core in response to receiving a wake signal, disable the master bus blocker in response to a powering on signal from the power management unit, send a signal to the software to reboot the core with a warm reset, and disable the slave bus blocker in response to a booting complete signal from the software.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a pipeline of processing steps may be utilized to process the circuit representation into one or more intermediate circuit representations followed by a final circuit representation which is then used to program or manufacture an integrated circuit. For example, a circuit representation in the form of a Chisel program may be stored on a non-transitory computer readable medium and may be processed by a computer to produce a FIRRTL intermediate circuit representation. The FIRRTL intermediate circuit representation may then be processed by a computer to produce a Verilog HDL (VHDL) intermediate circuit representation. The VHDL intermediate representation may then be processed by a computer to produce a netlist that is used to produce the integrated circuit. The foregoing steps may be executed by the same computer, different computers, or some combination thereof, depending on the implementation.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A processing system comprising:
one or more cores; and
a power management unit connected to the one or cores, wherein the power management unit is selected from one of:
  a first level power management unit when the one or more cores is a core, the first level power management unit configured to power scale the core;
  a second level power management unit when the one or more cores is two or more cores in a cluster, the second level power management unit configured to independently control power from a shared cluster power supply to each core of the two or more cores;
  a third level power management unit when each core of the two or more cores includes a power monitor, each power monitor configured to track power performance metrics of an associated core; and
  a fourth level power management unit when a complex includes multiple clusters and each cluster includes a different subset of the one or more cores, the fourth level power management unit including a complex power management unit and a cluster power management unit for each of the multiple clusters, the complex power management unit and cluster power management units providing two-tier power management for power allocation and core performance,
wherein the fourth level power management unit includes power management functionality of the third level power management unit, wherein the third level power management unit includes power management functionality of the second level power management unit, and wherein the second level power management unit includes power management functionality of the first level power management unit.

2. The processing system of claim 1, wherein the first level power management unit is configured to:
receive a performance operating point for the core from an operating system; and
apply a power dial based on the performance operating point to power scale the core.

3. The processing system of claim 1, wherein the second level power management unit is configured to:
receive a performance operating point for each core from an operating system; and
apply dynamic frequency scaling based on the performance operating point to power scale each core.

4. The processing system of claim 3, wherein the third level power management unit is configured to:
receive a performance operating point for each core from an operating system; and
apply dynamic voltage frequency scaling based on the performance operating point to power scale each core.

5. The processing system of claim 4, wherein each core has an independent power line and the third level power management unit is connected to each independent power line, the third level power management unit configured to control each independent power line.

6. The processing system of claim 1, wherein power monitors are connected to one of the third level power management unit or the fourth level power management unit, and uses a power link to communicate the power performance metrics.

7. The processing system of claim 6, wherein each power monitor tracks power activities.

8. The processing system of claim 7, wherein each power activity has a weight assigned by an operating system based on a performance criteria.

9. The processing system of claim 1, further including:
a high power rail;
a low power rail; and
linear dropout regulators, each linear dropout regulator connected to the high power rail and the low power rail.

10. The processing system of claim 1, wherein the complex power management unit is configured to allocate power to each core based on assessing power requirements received from the cluster power management units and each cluster power management unit configured to balance the power allocation among respective cores based on at least the power performance metrics.

11. The processing system of claim 1, wherein the two-tier power management enables the complex power management unit to assess power allocation with respect to a power grid for the complex and provides autonomy to each cluster power management unit to balance power distribution within a respective cluster.

12. The processing system of claim 1, wherein power management increases in granularity with a corresponding increase from the first level power management unit to the second level power management unit.

13. A method for power management, the method comprising:
providing multiple power management cores for integration with a selected processor core that includes one or more cores, wherein the multiple power management cores include:
  a first power management core when the one or more cores is a core, the first power management core configured to power scale the core of the one or more cores;
  a second power management core when the one or more cores is multiple cores in a cluster, the second power management core configured to independently control power from a shared power supply to the multiple cores;
  a third power management core when each core of the multiple cores includes a power monitor, each power monitor configured to track power performance metrics of an associated core; and
  a fourth power management core when a complex includes multiple clusters and each cluster includes a different subset of the one or more cores, the fourth power management core including a complex power management unit and a cluster power management unit for each cluster in the complex, wherein the complex power management unit and cluster power management units enable hierarchical power management for power allocation in a complex and balanced power delivery in each cluster.

14. The method of claim 13, further comprising with respect to at least the first power management core:
receiving a performance operating point for the core from an operating system; and applying a power dial based on the performance operating point to power scale the core.

15. The method of claim 14, further comprising with respect to at least the second power management core:
receiving a performance operating point for each core from the operating system; and
applying dynamic frequency scaling based on the performance operating point to power scale each core.

16. The method of claim 15, further comprising with respect to at least the third power management core:
receiving a performance operating point for each core from the operating system; and
applying dynamic voltage frequency scaling based on the performance operating point to power scale each core.

17. The method of claim 16, further comprising with respect to at least the third power management core:
independently controlling a power line associated with each core based on the power performance metrics.

18. The method of claim 16, further comprising with respect to at least the third power management core:
providing a power link to communicate the power performance metrics between the power monitors and at least the third power management core.

19. The method of claim 15, wherein the complex power management unit is configured to allocate power to each core based on assessing power requirements received from the cluster power management units and each cluster power management unit configured to balance the power allocation among respective cores based on at least the power performance metrics.

20. The method of claim 13, wherein power management increases in granularity with a corresponding increase from the third power management core to the fourth power management core.

21. A processing system comprising:
one or more cores; and
a power management unit connected to the one or cores, wherein the power management unit is selected from one of:
a first level power management unit when the one or more cores is a core, the first level power management unit configured to control power use without changing voltage or frequency;
a second level power management unit when the one or more cores is two or more cores in a cluster, the second level power management unit configured to control power use with separate power domains by power gating and changing frequency and not changing voltage;
a third level power management unit when each core of the two or more cores includes a power monitor, each power monitor configured to control power use with separate power domains by power gating and changing both voltage and frequency; and
a fourth level power management unit when a complex includes multiple clusters and each cluster includes a different subset of the one or more cores, the fourth level power management unit including a complex power management unit and a cluster power management unit for each of the multiple clusters, the complex power management unit and cluster power management units controlling power use with hierarchical power domains and controllers,
wherein the fourth level power management unit uses additional performance metric feedback information relative to the third level power management unit to tune a performance operating point of hardware to utilize available energy and power in an efficient manner to achieve performance goals.

* * * * *